(12) United States Patent
Ojha et al.

(10) Patent No.: US 7,577,582 B1
(45) Date of Patent: Aug. 18, 2009

(54) METHODS AND APPARATUS FOR FACILITATING TRANSACTIONS

(75) Inventors: Purnendu Shekhar Ojha, San Francisco, CA (US); Franklin Richard Schmidt, San Francisco, CA (US)

(73) Assignee: NexTag, Inc., San Mateo, CA (US)

( * ) Notice: Subject to any disclaimer, the term of this patent is extended or adjusted under 35 U.S.C. 154(b) by 0 days.

(21) Appl. No.: 09/493,750

(22) Filed: Jan. 28, 2000

Related U.S. Application Data

(63) Continuation-in-part of application No. 09/401,119, filed on Sep. 21, 1999, now abandoned.

(60) Provisional application No. 60/157,552, filed on Oct. 4, 1999.

(51) Int. Cl.
*G06Q 30/00* (2006.01)

(52) U.S. Cl. .................................. 705/26; 705/27

(58) Field of Classification Search ............ 705/26–27, 705/80, 37, 35, 39, 40; G06F 17/60
See application file for complete search history.

(56) References Cited

U.S. PATENT DOCUMENTS

| 5,253,165 A | * | 10/1993 | Leiseca et al. ................. 705/5 |
| 5,710,887 A | * | 1/1998 | Chelliah et al. ................ 705/26 |
| 5,774,870 A | * | 6/1998 | Storey ........................... 705/14 |
| 5,794,207 A | * | 8/1998 | Walker et al. .................... 705/1 |
| 5,797,127 A | * | 8/1998 | Walker et al. ................. 705/37 |
| 5,819,092 A | | 10/1998 | Ferguson et al. ............ 395/701 |
| 5,845,265 A | * | 12/1998 | Woolston ..................... 705/37 |
| 5,946,667 A | * | 8/1999 | Tull, Jr. et al. ................ 705/37 |
| 5,991,740 A | | 11/1999 | Messer .......................... 705/27 |
| 6,016,504 A | | 1/2000 | Arnold et al. ................ 709/200 |
| 6,029,141 A | | 2/2000 | Bezos et al. .................. 705/27 |
| 6,112,185 A | * | 8/2000 | Walker et al. .................... 705/5 |
| 6,249,772 B1 | * | 6/2001 | Walker et al. ................. 705/26 |
| 6,332,129 B1 | * | 12/2001 | Walker et al. ................. 705/26 |
| 6,338,050 B1 | * | 1/2002 | Conklin et al. ................ 705/80 |
| 6,405,175 B1 | | 6/2002 | Ng ................................ 705/14 |

(Continued)

FOREIGN PATENT DOCUMENTS

EP 1262894 * 12/2002

(Continued)

OTHER PUBLICATIONS

Elgin, "SPDR Web ensnares both active, passive fund managers", Corporate Cashflow; v14 n13; pp. 5-6; (from Dialog File 485, acc.# 00440032).*

(Continued)

*Primary Examiner*—Robert M. Pond
(74) *Attorney, Agent, or Firm*—Haverstock & Owens LLP

(57) ABSTRACT

Methods and apparatus are described for facilitating transactions in a wide area network. Information relating to a transaction between a first party and a second party is provided to a third party via the wide area network. The third party is then enabled to facilitate consummation of the transaction between the first and second parties via the wide area network. According to a specific embodiment, the information includes a bid price associated with the first party and an ask price associated with the second party, the third party being enabled to cover at least part of a difference between the bid and ask prices via the wide area network.

31 Claims, 45 Drawing Sheets

U.S. PATENT DOCUMENTS

| | | |
|---|---|---|
| 6,467,080 B1 | 10/2002 | Devine et al. ............... 717/123 |
| 6,473,752 B1 | 10/2002 | Fleming, III ................... 707/4 |
| 6,519,574 B1 * | 2/2003 | Wilton et al. ................. 705/37 |
| 6,542,594 B1 | 4/2003 | LeBoulzec ............. 379/201.03 |
| 6,629,135 B1 | 9/2003 | Ross, Jr. et al. ............. 709/218 |
| 6,754,636 B1 * | 6/2004 | Walker et al. ................. 705/26 |
| 6,925,442 B1 | 8/2005 | Shapira et al. ................ 705/10 |
| 7,039,603 B2 * | 5/2006 | Walker et al. ................. 705/26 |
| 7,076,455 B1 | 7/2006 | Fogelson ..................... 705/27 |
| 7,127,415 B1 | 10/2006 | Verchere ...................... 705/26 |
| 7,162,437 B2 | 1/2007 | Shaak et al. .................. 705/26 |
| 2002/0147663 A1 * | 10/2002 | Walker et al. |
| 2002/0165849 A1 | 11/2002 | Singh et al. .................... 707/1 |
| 2003/0014306 A1 | 1/2003 | Marko ......................... 705/14 |
| 2003/0033205 A1 | 2/2003 | Nowers et al. ................ 705/26 |
| 2003/0055816 A1 | 3/2003 | Paine et al. .................... 707/3 |
| 2005/0097204 A1 | 5/2005 | Horowitz et al. ............ 709/223 |
| 2005/0125397 A1 | 6/2005 | Gross et al. .................... 707/3 |
| 2005/0131884 A1 | 6/2005 | Gross et al. .................... 707/3 |

FOREIGN PATENT DOCUMENTS

| | | |
|---|---|---|
| WO | WO 00/22548 | 4/2000 |

OTHER PUBLICATIONS

Printouts from website http://www.priceline.com homepages, this website was created by Walker et al. (4 pages).*

From http://www.priceline.com, Press Release Archive: Priceline.com, a new buyer-driven commerce system launching . . . , Feb. 11, 1998 (3 pages).*

From http://www.priceline.com, Press Release Archive, "With Priceline.com, consumers can request any price they are ready to pay . . . ", Apr. 6, 1998, (3 pages).*

McFeely, Derwent-Acc-No. 2003-209774. "Electronic trading activity data distribution system for online financial services . . . ", Dec. 5, 2002.*

Ketonen et al., Derwent-Acc-No. 2002-674224, "Information providing system for personal assistant system, processes query received from mobile client . . . ", Aug. 8, 2002.*

Kovski, Agencies pay for fear of hedging, analyste say, Oil Daily, v48, n70, p1(a), Apr. 13, 1998 (from Dialog file 148, acc. No. 10173675).*

Jeffrey Krauss, "Subsidized TV sets?", CED (Communications, Engineering, and Design), Feb. 1998.*

Elkine, Peter; "The hype is big, really big, at Priceline," Fortune, Sep. 6, 1999, v140n5pp. 193-202; Dialog file 15 #01872500, 9pgs.*

* cited by examiner

300

| Guest | NexTag Main | Merchant | User Registration | FAQ | Company Info | neXTAG ---- for on-line Price Negotiations

THREE EASY STEPS FOR PRICE NEGOTIATIONS

1. Search for Computer Products you want
2. Save alternatives from search results into your list
3. Start negotiations by placing bids for selected items in your list Email
joev@beyerlaw.com Password
[          ] [Login]

I forgot my password
I would like to Register

Hi Guest

User level: "Beginner"

Multi-merchant Product search

Product Type [ ANY ▼ ]    Advanced Search

Keyword(s): [          ] [Go]

| SHORTLIST FOR my list | | | | | Sorted by | Most Recent ▼ | | |
|---|---|---|---|---|---|---|---|---|
| Product | Manufacturer | Merchant | List Price | Comments | Ask Price | Bid Price | Bid | Edit |
| Share your lists with friends, family, or co-workers - get their opinions for your purchase ||||||||||
| Email this table to | [          ] | | | | | | | Send |

| Logout | NexTag Main | Merchant | Account Info | FAQ | Company Info |

Joe's Dashboard:
User Mode: Intermediate

| STEP1 Use Existing Shopping List or create a new one by typing an item name and clicking "New" |||||
| --- | --- | --- | --- | --- |
| SHOPPING LIST | my list ▼ | Edit | | New |
| STEP2 Multi-merchant Product search - to identify alternatives for your Shopping List item |||||

| Product Type | Laptop ▼ | | Advanced Search |
| Keyword(s): | thinkpad 600 | Go | |

| SHORTLIST FOR my list | | | | | | | Sorted by | Most Recent ▼ |
| --- | --- | --- | --- | --- | --- | --- | --- | --- |
| Product | Manufacturer | Merchant | List Price | Comments | Ask Price | Bid Price | Bid | Edit |
| Share your lists with friends, family, or co-workers - get their opinions for your purchase |||||||||
| Email this table to | | | | | | | | Send |

Fig. 4

| Logout | NexTag Main | Merchant | Account Info | FAQ | Company Info |

Nextag Advanced Search:

Make selections to describe the Product you are looking for:

Product Type: Laptop ▼      Media: System ▼
Processor: ANY ▼      Speed: ANY ▼
Display Size: ANY ▼

Type in any of the parameters below and click search

Manufacturer: [      ]      List Price Range: Min. ($): [   ]  Max. ($): [   ]

Keywords: thinkpad 600      [Search]

Nextag Search Results:

14 Products found

| SORT BY: | | | |
|---|---|---|---|
| Manufacturer | Product | Lowest Price | Save to List |
| IBM | THINKPAD 600 P2-233 3.2GB 32MB 12.1 TFT 24X WIN 95 | $2198.99 | Save |
| IBM | THINKPAD 600 P2-233 3.2GB 32MB 12.1 TFT 24X WIN 95 | $2248.00 | Save |
| IBM | THINKPAD 600E P2 300PE 4.0GB 32MB 13.3 TFT 24X WIN 98/95 | $2732.36 | Save |
| IBM | THINKPAD 600 P2-266 4.0GB 32MB 13.3 TFT 24X WIN 95 | $2798.99 | Save |
| IBM | THINKPAD 600 P2-266 NO HD 32MB 13.3 TFT NO O/S (NIP) | $2811.93 | Save |
| IBM | THINKPAD 600 P2-300 5.1GB 64MB 24X 13.3 TFT WIN NT | $3455.22 | Save |
| IBM | THINKPAD 600 P2-266 4.0GB NO*IBM* PROGRAM*DISCOUNTS NO*RET | $3490.19 | Save |
| IBM | THINKPAD 600 P2-300 5.1GB 64MB 24X 13.3 TFT WIN 98 | $3498.99 | Save |
| IBM | THINKPAD 600E P2-300 6.4GB 64MB DVD 13.3 TFT WIN 98 | $3651.99 | Save |
| IBM | THINKPAD 600E P2-300 6.4GB 32MB 13.3 TFT 2X DVD WIN 98 | $3698.99 | Save |
| IBM | THINKPAD 600E P2-366 6.4GB 64MB 13.3 TFT 2X DVD WIN 98/95 | $3828.92 | Save |
| IBM | THINKPAD 600E P2-366 6.4GB 64MB 13.3 TFT DVD WIN 98/95 | $3920.81 | Save |
| IBM | THINKPAD 600E P2-366 6.4GB 64MB 13.3 TFT 24X NT | $3920.81 | Save |
| IBM | THINKPAD 600 P2-300 5.1GB NO IBM PROGRAM DISCOUNTS/NO RET | $4152.28 | Save |

Fig. 5

| Logout | NexTag Main | Merchant | Account Info | FAQ | Company Info |

Nextag Advanced Search:

Make selections to describe the Product you are looking for:

| Product Type: | Laptop ▼ | | Media: | System ▼ |
| Processor: | ANY ▼ | | Speed: | ANY ▼ |
| Display Size: | ANY ▼ | | | |

Type in any of the parameters below and click search

| Manufacturer: | | List Price Range: | Min. ($): | | Max. ($): | |
| Keywords: | thinkpad 600 | | Search | | | |

Nextag Search Results:

14 Products found

| SORT BY: | | | |
|---|---|---|---|
| Manufacturer | Product | Lowest Price | Save to List |
| IBM | THINKPAD 600 P2-233 3.2GB 32MB 12.1 TFT 24X WIN 95 | $2198.99 | Saved |
| IBM | THINKPAD 600 P2-233 3.2GB 32MB 12.1 TFT 24X WIN 95 | $2248.00 | Saved |
| IBM | THINKPAD 600E P2 300PE 4.0GB 32MB 13.3 TFT 24X WIN 98/95 | $2732.36 | Saved |
| IBM | THINKPAD 600 P2-266 4.0GB 32MB 13.3 TFT 24X WIN 95 | $2798.99 | Saved |
| IBM | THINKPAD 600 P2-266 NO HD 32MB 13.3 TFT NO O/S (NIP) | $2811.93 | Save |
| IBM | THINKPAD 600 P2-300 5.1GB 64MB 24X 13.3 TFT WIN NT | $3455.22 | Save |
| IBM | THINKPAD 600 P2-266 4.0GB NO*IBM* PROGRAM*DISCOUNTS NO*RET | $3490.19 | Save |
| IBM | THINKPAD 600 P2-300 5.1GB 64MB 24X 13.3 TFT WIN 98 | $3498.99 | Save |
| IBM | THINKPAD 600E P2-300 6.4GB 64MB DVD 13.3 TFT WIN 98 | $3651.99 | Save |
| IBM | THINKPAD 600E P2-300 6.4GB 32MB 13.3 TFT 2X DVD WIN 98 | $3698.99 | Save |
| IBM | THINKPAD 600E P2-366 6.4GB 64MB 13.3 TFT 2X DVD WIN 98/95 | $3828.92 | Save |
| IBM | THINKPAD 600E P2-366 6.4GB 64MB 13.3 TFT DVD WIN 98/95 | $3920.81 | Save |
| IBM | THINKPAD 600E P2-366 6.4GB 64MB 13.3 TFT 24X NT | $3920.81 | Save |
| IBM | THINKPAD 600 P2-300 5.1GB NO IBM PROGRAM DISCOUNTS/NO RET | $4152.28 | Save |

| Logout | NexTag Main | Merchant | Account Info | FAQ | Company Info | Help |

Joe's Dashboard:

| STEP1 Multi-merchant Product search - to identify alternatives for your Shopping List item |
|---|
| Product Type [ANY ▼]    Advanced Search |
| Keyword(s): [          ] [Go] |
| STEP2 Use Existing Shopping List or create a new one by clicking "New" |

SHOPPING LIST [my list ▼] [Edit] [New List]

| SHOPPING LIST FOR my list | | | | |
|---|---|---|---|---|
| IBM | THINKPAD 600 P2-233 3.2GB 32MB 12.1 TFT 24X WIN 95 | Units [1] | [Comment] | ☒ |
| IBM | THINKPAD 600 P2-233 3.2GB 32MB 12.1 TFT 24X WIN 95 | Units [1] | [Comment] | ☒ |
| IBM | THINKPAD 600E P2 300 4.0GB 32MB 13.3 TFT 24X WIN 98/95 | Units [1] | [Comment] | ☒ |
| IBM | THINKPAD 600 P2-266 3.2GB 32MB 13.3 TFT 24X WIN 95 | Units [1] | [Comment] | ☒ |

| Share your lists with friends, family, or co-workers - get their opinions for your purchase |
|---|
| Email this table to [          ] [Send] |

| Logout | NexTag Main | Adv. Search | Account Info | FAQ | Company Info |
|---|---|---|---|---|---|
| | | Product Details | | | |

NexTag -- Product Details and Prices at ALL Merchants

SHOPPING LIST [my list ▼]  [Edit]  [New List]

| Manufacturer | Product | Manuf. Part# | Units |
|---|---|---|---|
| IBM | THINKPAD 600 P2-233 3.2GB 32MB 12.1 TFT 24X WIN 95 | 264535U | 1 |

| Merchant | Updated | In Stock? | List | Ask | Bid | Save |
|---|---|---|---|---|---|---|
| Merchant 1 | Feb 3, 1999 | Y | $2198.99 | $2198.99 [Buy] | 2000.0 [Bid] | [Save] |
| Merchant 2 | Dec 10, 1998 | Y | $2794.39 | $2794.39 [Buy] | [Bid] | [Save] |
| Merchant 3 | Jan 13, 1999 | | $2800.19 | $2800.19 [Buy] | [Bid] | [Save] |
| Merchant 4 | Nov 30, 1998 | Yes | $2829.0 | $2829.0 [Buy] | [Bid] | [Save] |
| Merchant 5 | Jan 3, 1999 | | $2985.99 | $2985.99 [Buy] | [Bid] | [Save] |

Product Description:

PRODUCT IMAGE & DESCRIPTION

| Logout | NexTag Main | Merchant | Account Info | FAQ | Company Info | Help |

Joe's Dashboard:

STEP1 Multi-merchant Product search -- to identify alternatives for your Shopping List item Product Type [ANY ▼]   Advanced Search Keyword(s): [                    ] [Go]

STEP2 Use Existing Shopping List or create a new one by clicking "New"

SHOPPING LIST [my list ▼] [Edit] [New List]

SHOPPING LIST FOR my list

IBM    THINKPAD 600 P2-233 3.2GB 32MB 12.1 TFT 24X WIN 95    Units [1]    [Comment]  ☒

| Merchant | List Price | Ask Price | | Bid Price | | |
|---|---|---|---|---|---|---|
| Merchant 1 | $2198.99 | $2198.99 | [Buy] | $[2000.0] [Bid] | [Comment] | ☒ |
|  | $2198.99 | $2198.99 | [Buy] | $[     ] [Bid] | [Comment] | ☒ |

IBM    THINKPAD 600 P2-233 3.2GB 32MB 12.1 TFT 24X WIN 95    Units [1]    [Comment]  ☒

| Merchant | List Price | Ask Price | | Bid Price | | |
|---|---|---|---|---|---|---|
| Merchant 4 | $2248.00 | $2248.00 | [Buy] | $[2100.0] [Bid] | [Comment] | ☒ |

IBM    THINKPAD 600E P2-300PE 4.0GB 32MB 13.3 TFT 24X WIN 98/95    Units [1]    [Comment]  ☒

| Merchant | List Price | Ask Price | | Bid Price | | |
|---|---|---|---|---|---|---|
| Merchant 6 | $2732.36 | $2732.36 | [Buy] | $[2500.0] [Bid] | [Comment] | ☒ |

IBM    THINKPAD 600 P2-266 4.0GB 32MB 13.3 TFT 24X WIN 95    Units [1]    [Comment]  ☒

| Merchant | List Price | Ask Price | | Bid Price | | |
|---|---|---|---|---|---|---|
| Merchant 1 | $2798.99 | $2798.99 | [Buy] | $[2600.0] [Bid] | [Comment] | ☒ |

Share your lists with friends, family, or co-workers - get their opinions for your purchase Email this table to [                    ] [Send]

Beta evaluators, please email your feedback to beta@nextag.com

| Merchant Login | NexTag Main | Adv. Search | FAQ | Company Info | neXTAG --- login page for Member Merchants

Your Website for:

1. Incremental revenues from existing and new customers
2. Cost savings: Lowering your call center costs
3. Selectively lower pricing for selected buyers without affecting prices charged to others
4. Making Block sales by lowering prices by an amount driven by real-time product demand curves
5. Market and Buyer data including real-time demand curves, and product price histories Registered Members                         Merchant Visitors Email                                      Buyer Services
[                    ]                     Contact Us to join
Password
[          ] [Login]
I forgot my password

| Logout | Dashboard | Account Info | Business Rules | NexTag Main |
|---|---|---|---|---|
| | Edit this View | | | |

NexTag Merchant Main: super for Merchant 1

| Bids to Display: | | | Sorting Order | |
|---|---|---|---|---|
| By Bid Type: | By Bid-List Spread | | Primary | Secondary |
| All Bids ▼ | Max $: ▼ OK | Max %: ▼ | Buyer ▼ | ▼ |

| Product | Buyer Id | Units | Your List | Your Ask | Bid to You | Min Bid | Max Bid |
|---|---|---|---|---|---|---|---|
| THINKPAD 600 P2-233 3.2GB 32MB 12.1 TFT 24X WIN 95 | 187 | | $2198.99 | $2198.99 | | | |
| PALM III CONNECTED ORGANIZER PALMPILOT | 148 | 5 | $269.00 | | | $305.00 | $305.00 |
| THINKPAD 600 P2-233 3.2GB 32MB 12.1 TFT 24X WIN 95 | 147 | 1 | $2198.99 | $2198.99 | $2000.00 | $2000.00 | $2000.00 |
| THINKPAD 600 P2-233 3.2GB 32MB 12.1 TFT 24X WIN 95 | 147 | 1 | | | | $2100.00 | $2100.00 |
| THINKPAD 600E P2-300PE 4.0GB 32MB 13.3 TFT 24X WIN 98/95 | 147 | 1 | $2999.00 | | | $2500.00 | $2500.00 |
| THINKPAD 600 P2-266 4.0GB 32MB 13.3 TFT 24X WIN 95 | 147 | 1 | $2798.99 | $2798.99 | $2600.00 | $2600.00 | $2600.00 |
| OMNIBOOK 2100 P2-233 4.0 GB-HD 32MB 12.1 TFT 24X WIN95 NO PP | 128 | | $1998.99 | $1998.99 | | | |
| OMNIBOOK 2100 P2-266 4.0 GB-HD 32MB 12.1 TFT 24X WIN95-NO PP/R | 128 | | $2398.99 | $2398.99 | | | |
| THINKPAD 600 P2-233 3.2GB 32MB 12.1 TFT 24X WIN 95 | 127 | | $2198.99 | $2198.99 | | | |
| THINKPAD 600 P2-233 3.2GB 32MB 12.1 TFT 24X WIN 95 | 109 | | $2198.99 | $2198.99 | | | |
| BACKOFFICE SMALL BUSINESS SRV WIN-NT W/OFFICE PRO 5 CLIENT | 109 | 10 | $3350.00 | | | $2800.00 | $2800.00 |
| THINKPAD 600 P2-233 3.2GB 32MB 12.1 TFT 24X WIN 95 | 108 | | $2198.99 | $2198.99 | | | |
| THINKPAD 600 P2-233 3.2GB 32MB 12.1 TFT 24X WIN 95 | 107 | | | | | | |
| THINKPAD 600 P2-233 3.2GB 32MB 12.1 TFT 24X WIN 95 | 88 | | $2198.99 | $2198.99 | | | |
| THINKPAD 600 P2-233 3.2GB 32MB 12.1 TFT 24X WIN 95 | 87 | | $2198.99 | $2198.99 | | | |
| PALM III CONNECTED ORGANIZER PALMPILOT | 67 | 1 | $269.00 | $269.00 | $265.00 | $265.00 | $265.00 |
| BACKOFFICE CLIENT ACCESS LICENSE V4.0 FOR WINDOWS NT 20 | 59 | 1 | $3699.95 | $3699.95 | $3600.00 | $3400.00 | $3600.00 |
| TECRA 750CDM PENT-233 MMX 5.1GB 32MB 13.3 TFT 20X WIN NT 4.0 | 58 | 1 | | | | $2100.00 | $2350.00 |
| PALM III CONNECTED ORGANIZER PALMPILOT | 57 | 1 | $269.00 | $269.00 | $282.00 | $282.00 | $282.00 |
| THINKPAD 600 P2-233 3.2GB 32MB 12.1 TFT 24X WIN 95 | 53 | 1 | $2198.99 | $2198.99 | $2600.00 | $2300.00 | $2600.00 |

Pages: 1 2 3

1200

| Logout | Dashboard | Account Info | Business Rules | NexTag Main |
|---|---|---|---|---|
| | Trading Screen | | | |

NexTag Trading Screen for Merchant 1

| Product | Manufacturer | Manuf. Part# | List Price | Ask Price | Buyer Email | Bid Price |
|---|---|---|---|---|---|---|
| THINKPAD 600 P2-233 3.2GB 32MB 12.1 TFT 24X WIN 95 | IBM | 264535U | $2198.99 | $2198.99 | joev@beyerlaw.com | $2000.00 |

| BID-SPECIFIC RESPONSE | |
|---|---|
| You have two options for this bid: | |
| 1. Accept the Buyer's Bid Price: | Accept Bid Price |
| 2. Change your Ask Price: | $ 2100.00  Submit |
| BLOCK RESPONSE | |
| All bids to you that are higher than the block ask price will be accepted at the corresponding bid price. Other bidders for this product will receive your Block Ask Price. | |
| Block Ask Price: | $  Submit |

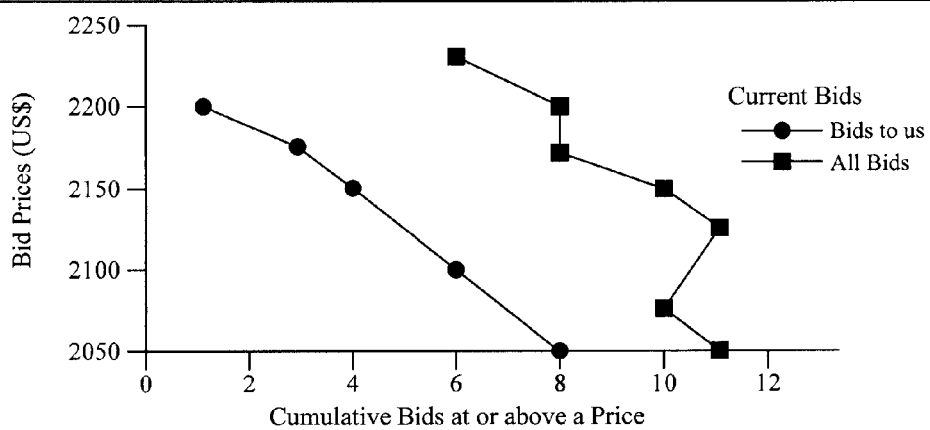

| Buyer Details | | | |
|---|---|---|---|
| Email Address: | joev@beyerlaw.com | First Name: | Joe |
| Company Name: | Beyer & Weaver | Job Title: | |
| Address (line1): | | Address (line2): | |
| City: | | State: | |
| Country (if not USA): | | Phone Number: | |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | % Bid-List Spread ▼ | Max % Spread: | 2.0  AND.. |
| Pricing Response: | Counter-Offer ▼ | Reduce Ask by: | ● 1.0 % of list  ○ $ |
| Text Response: | This offer good for 8 hours. | | |
| New Rule | | Password | |
| | | | Submit  Reset |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | Bid-List Spread ▼ | Max $ Spread: | [ ] AND.. |
| Pricing Response: | Counter-Offer ▼ | Reduce Ask by: | ● [1.0] % of list ○ $ [ ] |
| Text Response: | This offer good for 8 hours. | | |
| New Rule | | Password | [ ] |
| | | | Submit  Reset |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | Product Specific ▼ | Enter product UPC codes | AND.. |
| | | | |
| Pricing Response: | Counter-Offer ▼ | Reduce Ask by: | ● 1.0 % of list  ○ $ |
| Text Response: | This offer good for 8 hours. | | |
| New Rule | | Password | |
| | | | Submit  Reset |

| Logout | Dashboard | Account Info | Business Rules | NexTag Main |

NexTag Business Rules for Merchant 1

| Rule Number 1 | | | |
|---|---|---|---|
| Comment: | Price Drop Counter-Offer | Email Bids to: | purnendu@nextag.com |
| Criteria: | Buyer Specific ▼ | Enter buyer emails or domains | AND.. |
| | | | |
| Pricing Response: | Counter-Offer ▼ | Reduce Ask by: | ● 1.0 % of list  ○ $ |
| Text Response: | This offer good for 8 hours. | | |
| New Rule | | Password | |
| | | | Submit  Reset |

| Logout | Dashboard | Account Info | Business Rules | NexTag Main | Help |

NexTag Business Rules for Merchant 1

Current Business Rules: [          ] [          ]
[Create New Rule] [Delete Current Rule]

Title: [          ]

If all of the following criteria are true
☒ In product set [Hi Inventory ▼]
☒ % Bid-List Spread [>= ▼] [50.0]
   add criteria ▼

Then do the following actions
☒ Display text
   [Please be serious -- your bid is less than half our list price]
   add action ▼

| Logout | Dashboard | Account Info | Business Rules | NexTag Main | Help |

NexTag Business Rules for Merchant 1

Current Business Rules: [　　　　　　　　　　　] [　　　　　　　　]
[　　　　　　　]

[ Create New Rule ]   [ Delete Current Rule ]

Title: [　　　　　　　　　　　　　]

If all of the following criteria are true

☒ In product set [Hi Inventory ▼]

☒ % Bid-List Spread [<= ▼] [50.0]

☒ % Bid-List Spread [>= ▼] [10.0]

[add criteria ▼]

Then do the following actions

☒ Reduce ask by % of list [10.0]

☒ Display text
    [We have a great deal for you - we can offer you a 10% discount]

[add action ▼]

| Logout | Dashboard | Account Info | Business Rules | NexTag Main | Help |

NexTag Business Rules for Merchant 1

Current Business Rules: [        ] [        ]
[        ]

[ Create New Rule ]  [ Delete Current Rule ]

Title: [        ]

If all of the following criteria are true
☒ In product set [Hi Inventory ▼]
☒ % Bid-List Spread [<= ▼] [10.0]
   [add criteria ▼]

Then do the following actions
☒ Accept bid
☒ Display text
   [You have a deal from Merchant 1 -- we will sell you at your bid price]
   [add action ▼]

| Logout | Dashboard | Account Info | Business Rules | NexTag Main | Help |

NexTag Business Rules for Merchant 1

Current Business Rules: [          ] [          ]
[          ]

[ Create New Rule ]  [ Delete Current Rule ]

Title: [          ]

If all of the following criteria are true

☒ # of units  [ >= ▼ ]  [ 50 ]
   [ add criteria ▼ ]

Then do the following actions

☒ Reduce ask by % of list [ 10.0 ]
☒ Display text
   [ We can offer you a 10% high volume discount to our list price ]
   [ add action ▼ ]

| Logout | Dashboard | Account Info | Business Rules | NexTag Main | Help |

NexTag Business Rules for Merchant 1

Current Business Rules: [      ] [      ]
[      ]

[ Create New Rule ] [ Delete Current Rule ]

Title: [      ]

If all of the following criteria are true

☒ # of units        [ >= ▼ ] [ 10 ]
☒ % Bid-List Spread [ <= ▼ ] [ 20.0 ]
☒ Buyer Reputation  [ >= ▼ ] [ 0 ]
   [ add criteria ▼ ]

Then do the following actions

☒ Reduce ask by % of list [ 6.0 ]
☒ Display text
   [ We can offer you a 6% volume discount ]
   [ add action ▼ ]

| Logout | Dashboard | Account Info | Business Rules | NexTag Main | Help |

NexTag Business Rules for Merchant 1

Current Business Rules: [          ]
[          ]
[ Create New Rule ]  [ Delete Current Rule ]

Title: [          ]

If all of the following criteria are true

[ add criteria ▼ ]

Then do the following actions

[ add action ▼ ]

| Logout | Dashboard | Account Info | Business Rules | NexTag Main | Help |

NexTag Business Rules for Merchant 1

Current Business Rules: [          ] [          ]

[ Create New Rule ]  [ Delete Current Rule ]

Title: [          ]

If all of the following criteria are true

☒ Buyer Reputation  [>=  ▼]  [20]

☒ # of units  [>=  ▼]  [10]

[add criteria  ▼]

Then do the following actions

☒ Reduce ask by % of list  [10]

☒ Display text
   [Because of your excellent reputation we are able to offer you a 10% volume discount]

[add action  ▼]

| Logout | Dashboard | Account Info | Business Rules | NexTag Main |
|---|---|---|---|---|
| | Edit this View | | | |

NexTag Merchant Main: super for Merchant 1

| Bids to Display: | | | Sorting Order | |
|---|---|---|---|---|
| By Bid Type: | By Bid-List Spread | | Primary | Secondary |
| All Bids ▼ | Max $: ▼ OK | Max %: ▼ | Buyer ▼ | ▼ |

| Product | Buyer Id | Units | Your List | Your Ask | Bid to You | Min Bid | Max Bid |
|---|---|---|---|---|---|---|---|
| THINKPAD 600 P2-233 3.2GB 32MB 12.1 TFT 24X WIN 95 | 187 | | $2198.99 | $2198.99 | | | |
| PALM III CONNECTED ORGANIZER PALMPILOT | 148 | 5 | $269.00 | | | $305.00 | $305.00 |
| THINKPAD 600 P2-233 3.2GB 32MB 12.1 TFT 24X WIN 95 | 147 | 1 | $2198.99 | $2198.99 | $2000.00 | $2000.00 | $2000.00 |
| THINKPAD 600 P2-233 3.2GB 32MB 12.1 TFT 24X WIN 95 | 147 | 1 | | | | $2100.00 | $2100.00 |
| THINKPAD 600E P2-300PE 4.0GB 32MB 13.3 TFT 24X WIN 98/95 | 147 | 1 | $2999.00 | | | $2500.00 | $2500.00 |
| THINKPAD 600 P2-266 4.0GB 32MB 13.3 TFT 24X WIN 95 | 147 | 1 | $2798.99 | $2798.99 | $2600.00 | $2600.00 | $2600.00 |
| OMNIBOOK 2100 P2-233 4.0 GB-HD 32MB 12.1 TFT 24X WIN95 NO PP | 128 | | $1998.99 | $1998.99 | | | |
| OMNIBOOK 2100 P2-266 4.0 GB-HD 32MB 12.1 TFT 24X WIN95-NO PP/R | 128 | | $2398.99 | $2398.99 | | | |
| THINKPAD 600 P2-233 3.2GB 32MB 12.1 TFT 24X WIN 95 | 127 | | $2198.99 | $2198.99 | | | |
| THINKPAD 600 P2-233 3.2GB 32MB 12.1 TFT 24X WIN 95 | 109 | | $2198.99 | $2198.99 | | | |
| BACKOFFICE SMALL BUSINESS SRV WIN-NT W/OFFICE PRO 5 CLIENT | 109 | 10 | $3350.00 | | | $2800.00 | $2800.00 |
| THINKPAD 600 P2-233 3.2GB 32MB 12.1 TFT 24X WIN 95 | 108 | | $2198.99 | $2198.99 | | | |
| THINKPAD 600 P2-233 3.2GB 32MB 12.1 TFT 24X WIN 95 | 107 | | | | | | |
| THINKPAD 600 P2-233 3.2GB 32MB 12.1 TFT 24X WIN 95 | 88 | | $2198.99 | $2198.99 | | | |
| THINKPAD 600 P2-233 3.2GB 32MB 12.1 TFT 24X WIN 95 | 87 | | $2198.99 | $2198.99 | | | |
| PALM III CONNECTED ORGANIZER PALMPILOT | 67 | 1 | $269.00 | $269.00 | $265.00 | $265.00 | $265.00 |
| BACKOFFICE CLIENT ACCESS LICENSE V4.0 FOR WINDOWS NT 20 | 59 | 1 | $3699.95 | $3699.95 | $3600.00 | $3400.00 | $3600.00 |
| TECRA 750CDM PENT-233 MMX 5.1GB 32MB 13.3 TFT 20X WIN NT 4.0 | 58 | 1 | | | | $2100.00 | $2350.00 |
| PALM III CONNECTED ORGANIZER PALMPILOT | 57 | 1 | $269.00 | $269.00 | $282.00 | $282.00 | $282.00 |
| THINKPAD 600 P2-233 3.2GB 32MB 12.1 TFT 24X WIN 95 | 53 | 1 | $2198.99 | $2198.99 | $2600.00 | $2300.00 | $2600.00 |

Pages: 1 2 3

900

| Logout | NexTag Main | Merchant | Account Info | FAQ | Company Info | Help |

Joe's Dashboard:

STEP1 Multi-merchant Product search -- to identify alternatives for your Shopping List item Product Type [ANY ▼]     Advanced Search
Keyword(s): [       ] [Go]

STEP2 Use Existing Shopping List or create a new one by clicking "New"

SHOPPING LIST [my list ▼] [Edit] [New List]

SHOPPING LIST FOR my list

IBM    THINKPAD 600 P2-233 3.2GB 32MB 12.1 TFT 24X WIN 95    Units [1] [Comment] ☒

| Merchant | List Price | Ask Price | | Bid Price | | |
|---|---|---|---|---|---|---|
| Merchant 1 | $2198.99 | $2100.00 | [Buy] | $ [2000.0] [Bid] | [Comment] | ☒ |

IBM    THINKPAD 600 P2-233 3.2GB 32MB 12.1 TFT 24X WIN 95    Units [1] [Comment] ☒

| Merchant | List Price | Ask Price | | Bid Price | | |
|---|---|---|---|---|---|---|
| Merchant 4 | $2248.00 | $2248.00 | [Buy] | $ [2100.0] [Bid] | [Comment] | ☒ |

IBM    THINKPAD 600E P2-300PE 4.0GB 32MB 13.3 TFT 24X WIN 98/95    Units [1] [Comment] ☒

| Merchant | List Price | Ask Price | | Bid Price | | |
|---|---|---|---|---|---|---|
| Merchant 6 | $2732.36 | $2732.36 | [Buy] | $ [2500.0] [Bid] | [Comment] | ☒ |

IBM    THINKPAD 600 P2-266 4.0GB 32MB 13.3 TFT 24X WIN 95    Units [1] [Comment] ☒

| Merchant | List Price | Ask Price | | Bid Price | | |
|---|---|---|---|---|---|---|
| Merchant 1 | $2798.99 | $2798.99 | [Buy] | $ [2600.0] [Bid] | [Comment] | ☒ |

Share your lists with friends, family, or co-workers - get their opinions for your purchase
Email this table to [                  ] [Send]

Beta evaluators, please email your feedback to beta@nextag.com

| Logout | NexTag Main | Merchant | Account Info | FAQ | Company Info | Help |

Joe's Dashboard:

STEP1 Multi-merchant Product search -- to identify alternatives for your Shopping List item Product Type [ANY ▼]   Advanced Search
Keyword(s): [         ] [Go]

STEP2 Use Existing Shopping List or create a new one by clicking "New"

SHOPPING LIST [my list ▼] [Edit] [New List]

SHOPPING LIST FOR my list

IBM     THINKPAD 600 P2-233 3.2GB 32MB 12.1 TFT 24X WIN 95     Units [1] [Comment] ☒

| Merchant | List Price | Ask Price | | Bid Price | | |
|---|---|---|---|---|---|---|
| Merchant 1 | $2198.99 | $2100.00 | [Buy] | $ [2050.0] [Bid] | [Comment] | ☒ |

IBM     THINKPAD 600 P2-233 3.2GB 32MB 12.1 TFT 24X WIN 95     Units [1] [Comment] ☒

| Merchant | List Price | Ask Price | | Bid Price | | |
|---|---|---|---|---|---|---|
| Merchant 4 | $2248.00 | $2248.00 | [Buy] | $ [2100.0] [Bid] | [Comment] | ☒ |

IBM     THINKPAD 600E P2-300PE 4.0GB 32MB 13.3 TFT 24X WIN 98/95     Units [1] [Comment] ☒

| Merchant | List Price | Ask Price | | Bid Price | | |
|---|---|---|---|---|---|---|
| Merchant 6 | $2732.36 | $2732.36 | [Buy] | $ [2500.0] [Bid] | [Comment] | ☒ |

IBM     THINKPAD 600 P2-266 4.0GB 32MB 13.3 TFT 24X WIN 95     Units [1] [Comment] ☒

| Merchant | List Price | Ask Price | | Bid Price | | |
|---|---|---|---|---|---|---|
| Merchant 1 | $2798.99 | $2798.99 | [Buy] | $ [2600.0] [Bid] | [Comment] | ☒ |

Share your lists with friends, family, or co-workers - get their opinions for your purchase
Email this table to [                    ] [Send]

Beta evaluators, please email your feedback to beta@nextag.com

| Logout | Dashboard | Account Info | Business Rules | NexTag Main |
|--------|-----------|--------------|----------------|-------------|
|        | Trading Screen |         |                |             |

NexTag Trading Screen for Merchant 1

| Product | Manufacturer | Manuf. Part# | List Price | Ask Price | Buyer Email | Bid Price |
|---------|--------------|--------------|------------|-----------|-------------|-----------|
| THINKPAD 600 P2-233 3.2GB 32MB 12.1 TFT 24X WIN 95 | IBM | 264535U | $2198.99 | $2100.00 | joev@beyerlaw.com | $2050.00 |

| BID-SPECIFIC RESPONSE |
|---|
| You have two options for this bid: |
| 1. Accept the Buyer's Bid Price: [Accept Bid Price] |
| 2. Change your Ask Price: $ [____] [Submit] |
| BLOCK RESPONSE |
| All bids to you that are higher than the block ask price will be accepted at the corresponding bid price. Other bidders for this product will receive your Block Ask Price. |
| Block Ask Price: $ [____] [Submit] |

| Buyer Details | | | | |
|---|---|---|---|---|
| Email Address: | joev@beyerlaw.com | First Name: | Joe | |
| Company Name: | Beyer & Weaver | Job Title: | | |
| Address (line1): | | Address (line2): | | |
| City: | | State: | | |
| Country (if not USA): | | Phone Number: | | |

| Logout | NexTag Main | Merchant | Account Info | FAQ | Company Info | Help |

Joe's Dashboard:

STEP1 Multi-merchant Product search -- to identify alternatives for your Shopping List item Product Type [ANY ▼]  Advanced Search
Keyword(s): [      ] [Go]

STEP2 Use Existing Shopping List or create a new one by clicking "New"

SHOPPING LIST [my list ▼] [Edit] [New List]

SHOPPING LIST FOR my list

IBM    THINKPAD 600 P2-233 3.2GB 32MB 12.1    Units [1]  [Comment]  ☒
       TFT 24X WIN 95

| Merchant | List Price | Ask Price | Purchase Date | activate | |
|---|---|---|---|---|---|
| Merchant 1 | $2198.99 | $2050.00 | 1999-02-15 | Comment | ☒ |

IBM    THINKPAD 600 P2-233 3.2GB 32MB 12.1    Units [1]  [Comment]  ☒
       TFT 24X WIN 95

| Merchant | List Price | Ask Price | Purchase Date | activate | |
|---|---|---|---|---|---|
| Merchant 4 | $2248.00 | $2248.00 | | Comment | ☒ |

IBM    THINKPAD 600E P2-300PE 4.0GB 32MB    Units [1]  [Comment]  ☒
       13.3 TFT 24X WIN 98/95

| Merchant | List Price | Ask Price | Purchase Date | activate | |
|---|---|---|---|---|---|
| Merchant 6 | $2732.36 | $2732.36 | | Comment | ☒ |

IBM    THINKPAD 600 P2-266 4.0GB 32MB 13.3    Units [1]  [Comment]  ☒
       TFT 24X WIN 95

| Merchant | List Price | Ask Price | Purchase Date | activate | |
|---|---|---|---|---|---|
| Merchant 1 | $2798.99 | $2798.99 | | Comment | ☒ |

Share your lists with friends, family, or co-workers - get their opinions for your purchase Email this table to [            ] [Send]

Beta evaluators, please email your feedback to beta@nextag.com

Fig. 18

1900  FIND PRODUCTS

Home | My Account | Help | About Us | Joe | Reputation: 0 | Signout

| Getting Started | Find Products | My Bids | Order History |

 *Search for Products*

Search for: [                    ]  [ Go ]  | Search Tips | Advanced Search |

All Products:

- Computer Systems (1794)
  Desktops, Notebooks & Laptops,
  Multiprocessor & Servers, Handheld,
  Thin Clients

- Memory (7643)
  Generic, Brand Name & Proprietary,
  Boards & Chips, Macintosh,
  PDA & Notebook ...

- Monitors (946)
  Color, Flat Panel Displays, TouchScreen,
  Monochrome, Macintosh ...

- Graphics (608)
  Video Adapters, 3D Accelerators,
  Graphics Accelerators, Adapters &
  Converters, Macintosh

- Modems (1030)
  Internal, External, PCMCIA Card,
  Macintosh

- Telephony (1216)
  Telephones, Fax, AudioVideo
  Conferencing, PBX

- Accessories & Supplies (11622)
  Desk, Monitor, Notebook & PDA,
  Printer Supplies, Paper Supplies ...

- Media (1582)
  Tape Cartridges, Floppy Disks, Removable
  Disks, Optical Disk, CDR & CDRW

- Input Devices (1129)
  Keyboards, Mice, Trackball, Gamepads,
  Joysticks

- Scanners (289)
  Flatbed, Sheet-Fed, Barcode, Image

- Storage Devices (5546)
  Hard Drives, CD-ROM, CDR & CDRW,
  Optical, DVD ...

- Software (49918)
  Multimedia, Reference, Integrated
  Applications, Graphics, Entertainment ...

- Power Protection & Supplies (1304)
  UPS, Power Supplies, Batteries,
  Surge Suppressors, Isolators

- Printers (1441)
  Laser, Ink Jet, Line Printers, Plotters, Label
  Printers ...

- Service Agreements (16715)
  Online Services, Configuration Services,
  Hardware Maintenance Agreement, Software
  Maintenance Agreement, Technical Support ...

- Network & Communications (10641)
  Adapters & Interfaces, Network Hubs &
  Switches, Bridges, Routers, Gateways, WAN
  Communication Products, Satelite
  Communication Products

- Cables Wiring & Rack Systems (4547)
  Premise Wiring Cables & Rack Systems,
  Bulk Cable & Accessories, Patch Cords &
  Finished Cable, WAN Cables, Drive Cable ...

- Computer Chassis & Components (734)
  Motherboards, Cases, CPU

- Sound Cards & Multimedia (509)
  Sound Cards, Speakers, Headphones,
  Multimedia Kits, Sound Input Devices ...

- Camera & Imaging (248)
  Digital Cameras, WebCams, Mac Camera

Fig. 19

2000    PLACE BIDS

Home | My Account | Help | About Us | Joe | Reputation: 0 | Signout

| Getting Started | Find Products | My Bids | Order History |

Getting Started

Here's how NexTag.com works:

1 Search for desired computer products

Find the product you need either by entering the keywords in the search box and clicking on the 'Search' button or by using our well-organized product directory. Click on the product of your choice and we will give you a list of sellers along with their asking price for that product. (If you have registered, we will give you the total price including tax and shipping.)

2 Negotiate the price you want

Do you like the price offered by any of the merchants?

Yes. Then go ahead and buy it.

No. Then bid on the product and let the sellers know what you are willing to pay. You may either want to include all the sellers in your bid or only your favorite sellers. Some sellers will respond immediately and we will notify you by e-mail as soon as the others respond.

Response time, if not immediate, will generally be a matter of minutes during business hours.

3 Buy on your terms

Soon you may hear from a seller who is willing to give you the product at your price or is willing to offer you a price that's closer to your desired price. That's it! Go ahead and buy the product.

It is possible that you may receive one or more counteroffers from the sellers. You can then decide if you want to continue bidding or go ahead and buy the product at the best counteroffers you received.

It's that simple!

Need more information? See Help & FAQ

MY BIDS

Home | My Account | Help | About Us | Joe | Reputation: 0 | Signout

| Getting Started | Find Products | My Bids | Order History |

>> Click on an item (Brand/Model) below for details.

| Brand/Model | Your Bid | Lastest Total Seller Price |
|---|---|---|

ORDER HISTORY

Home | My Account | Help | About Us | Joe | Reputation: 0 | Signout

| Getting Started | Find Products | My Bids | Order History |

>> Joe Villeneuve - You have made 0 purchases through NexTag.com

| Date | Product | Qty. | Seller | Price per Unit | Tax | Shipping | Total Price | Status |
|------|---------|------|--------|----------------|-----|----------|-------------|--------|

Fig. 22

2300                                                      FIND PRODUCTS

Home | My Account | Help | About Us | Joe | Reputation: 0 | Signout

| Getting Started | Find Products | My Bids | Order History |

Search for Products

Search for: [                              ] [Go] | Search Tips | Advanced Search |

All Products:

- Pentium II 400 (28)
- Pentium II 366 (59)
- Pentium II 333 (30)
- Pentium II 300 (65)
- Pentium II 266 (25)
- Pentium II 233 (8)
- Pentium 266 (1)
- Pentium 233 (1)
- Celeron 466 (3)
- Celeron 433 (3)
- Celeron 400 (8)
- Celeron 366 (9)
- Celeron 333 (5)
- Celeron 300 (21)
- Celeron 266 (1)
- AMD (44)
- Macintosh (10)

2400                                                                                         FIND PRODUCTS

Home | My Account | Help | About Us | Joe | Reputation: 0 | Signout

| Getting Started | Find Products | My Bids | Order History |

*Search for Products*

Search for: [                 ] [ Go ] | Search Tips | Advanced Search |

All Products:: Computer Systems: Notebooks & Laptops: Celeron 433:

*Search Results*

Click on a link below to find Sellers offering a product. You can then bid your price to these Sellers.

3 items found

| Brand/Model<br>(Click to find a list of sellers) | In Stock | Lowest List Price* |
|---|---|---|
| AMS Tech ROADSTER 21CTD433 CELERON-433 6.4GB 32MB 12.1 TFT DVD 56K WIN | Yes | $1684.33 |
| AMS Tech ROADSTER 21CX433 CELERON-433 10.0GB 64MB 13.3 TFT 24X 56K WI | Yes | $2039.99 |
| AMS Tech TRAVELPRO 6040ECX CELERON-433 6.4GB 64MB 14.1 TFT 24X 56K WIN | Yes | $2239.99 |

Fig. 24

2500  PLACE BIDS

Home | My Account | Help | About Us | Joe | Reputation: 0 | Signout

| Getting Started | Find Products | My Bids | Order History |

AMS Tech TRAVELPRO 6040ECX CELERON-433 6.4GB 64MB 14.1 TFT 24X 56K WIN
Manuf Part #          SY6K-T76040
Lowest Price:         $2253.94  (see Price History)

>> BID TO SELLERS NOW!
Some sellers may respond immediately or we will notify you by e-mail as soon as a seller responds ☑ Bids to all sellers   Qty: 1   [Change]   Your Bid* ($) (incl tax & shipping) [     ]   [Place Bids]

|   | Seller | In Stock | List (Update Prices) | + Tax | +Shipping Ground ▼ | = Total | Buy |
|---|--------|----------|---------|-------|----------|---------|-----|
| ☑ | Merchant 1 (info) | 11 | $2239.99 | $0.00 | $13.95 | $2253.94 | Buy |
| ☑ | Merchant 2 (info) | yes | $2459.65 | $0.00 | $14.00 | $2473.65 | Buy |
| ☑ | Merchant 3 (info) |   | $2500.00 | $0.00 | $20.69 | $2521.38 | Buy |
| ☑ | Merchant 4 (info) | Yes | $2420.00 | $199.65 | $10.00 | $2629.65 | Buy |
| ☑ | Merchant 5 (info) | Yes | $2467.77 | $191.25 | $12.91 | $2671.93 | Buy |
| ☑ | Merchant 6 (info) | 15 | $2495.00 | $212.07 | $9.90 | $2716.97 | Buy |

Fig. 25

SPIFFER LOGIN
Email  
Password  [Login]
Fig. 26 (interface 2600)

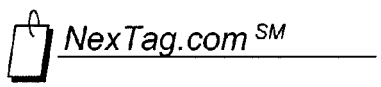

spiffer@nextag.com Dashboard

Home | Help & FAQ | User: spiffer@nextag.com | Signout

| Dashboard | Business Rules | Accepted Bids | Orders |

| Items to Display (0) | ☐ In Stock Only | Time Since Bid | 0-30 minutes ▼ | Sorting Order | |
|---|---|---|---|---|---|
| By Product Category: | By Promoted: | By Bid-Ask Spread | | Primary | Secondary |
| All ▼ | All ▼ | Max %: ▼ | | ▼ | ▼ |

Seller Is Responsible For Verifying Shipping, Tax and Product Price Prior To Accepting A Bid.
If You Have Any Questions: Please Contact Doreen Martinez @ 650-378-8528.

| Product Name (Stock) (Part #) Last Bid Time | Merchant | Units | Merchant Ask Price - My Promo = Ask to Buyer | Bid/ Ask-Bid diff | Respond | Buyer Id/ Rep/ Spiff Count | Last Response Time |
|---|---|---|---|---|---|---|---|

Fig. 27 (interface 2700)

spiffer@nextag.com Dashboard

Home | Help & FAQ | User: spiffer@nextag.com | Signout

| Dashboard | Business Rules | Accepted Bids | Orders |

| Items to Display (2) | ☐ In Stock Only | Time Since Bid | 0-30 minutes ▼ | Sorting Order | |
|---|---|---|---|---|---|
| By Product Category: | By Promoted: | By Bid-Ask Spread | | Primary | Secondary |
| All ▼ | All ▼ | Max %: ▼ | | ▼ | ▼ |

Seller Is Responsible For Verifying Shipping, Tax and Product Price Prior To Accepting A Bid.
If You Have Any Questions: Please Contact Doreen Martinez @ 650-378-8528.

| Product Name (Stock) (Part #) Last Bid Time | Merchant | Units | Merchant Ask Price - My Promo = Ask to Buyer | Bid/ Ask-Bid diff | Respond | Buyer Id/ Rep/ Spiff Count |
|---|---|---|---|---|---|---|
| 3Com PALM V (2706) (80400U) 12/8/99 10:33 AM | Egghead.com | 1 | $299.99 | $266.97 Accept $33.02, 11.0% | COUNTER | 55071 / 0 / 0 gnjmeyer@earthlink.com |
| 3Com PALM V (6) (A5132222) 12/8/99 10:33 AM | Sparco.com | 1 | $351.00 | $269.75 Accept $81.25, 23.1% | COUNTER | 55071 / 0 / 0 gnjmeyer@earthlink.com |

Fig. 28 (interface 2800)

BUSINESS RULES

Home | Help & FAQ | User: spiffer@nextag.com | Signout

| Dashboard | Business Rules | Accepted Bids | Orders |

>> Current Business Rules:
Select a business rule to see the details.

- Spiff Matrix and Austin Powers
- Spiff City of Angels/Bug's Life*

[Move Down]

[New Rule...] [Delete Rule...]

>> Business Rule Details:
Make necessary changes below and then click on the "Save Rule" button. (To cancel the changes, click on the "Undo Changes" button.

Title: [Spiff Matrix and Austin Powers]   ☑ enabled

Enter Comments for this rule

Spiff Austin Powers and The Matrix thru
CD World, if you are a new user. You
get 5 tries to get 1 movie.

If all of the following criteria are true
   All of the following
     ☒ # of units [<=] [1]
     ☒ Buyer Reputation [<=] [0]
     ☒ Buyer Reputation [>=] [0]
     Product Specific [NexTag Product Id]
   ☒  ☒ [3243728, 3244702]

☒ Buyer Spiff Count [<=] [5]
     ☒ Merchant Name [CDWorld] [Video]
     [add criteria]
  ☒ Product is in stock
Then do the following actions
  ☒ Accept bid
    [add action]

[Save Rule] [Undo Changes]

Fig. 29 (interface 2900)

BUSINESS RULES

Home | Help & FAQ | User: spiffer@nextag.com | Signout

| Dashboard | Business Rules | Accepted Bids | Orders |

>> Current Business Rules:
Select a business rule to see the details.

[Spiff Matrix and Austin Powers]
[Spiff City of Angels/Bug's Life*]

[Move Up] [Move Down]

Fig. 30 (interface 3000)

[New Rule...] [Delete Rule...]

---

>> Business Rule Details:
Make necessary changes below and then click on the "Save Rule" button. (To cancel the changes, click on the "Undo Changes" button.

Title: [Spiff City of Angels/Bug's Life*]   [✓] enabled

Enter Comments for this rule
[This spiffs City of Angels and A Bug's Life thru BOTH Muzic Depot and CD Universe and gives the user 3 tries (because each is a double spiff) to buy 1 movie.]

If all of the following criteria are true
    All of the following
        ☒ # of units [<=▼] [1]
        ☒ Buyer Reputation [<=▼] [0]
        ☒ Buyer Reputation [>=▼] [0]
        Product Specific [NexTag Product Id ▼]
☒      ☒ [3239706, 3241509                                    ]
        ☒ Buyer Spiff Count [<=▼] [6]
        [add criteria ▼]
    Any of the following
        ☒ Merchant Name [Muzic Depot ▼] [Video ▼]
☒     ☒ Merchant Name [CD Universe ▼] [Video ▼]
        [add criteria ▼]
    Any of the following
        ☒ Product is in stock
☒     [add criteria ▼]
[add criteria ▼]
Then do the following actions

Fig. 31 (interface 3100)

 NexTag.com<sup>SM</sup> Fig. 32 (interface 3200) ORDERS

Home | Help & FAQ | User: spiffer@nextag.com | Signout

| Dashboard | Business Rules | Accepted Bids | Orders |

⦿ New Orders   ◯ In Progress Orders   ◯ Completed Orders

| Date | Buyer | Brand/Model | Units | Unit Price | Subtotal | My Promo | Merchant |
|---|---|---|---|---|---|---|---|
| 10/22/99 10:32:40 PDT | 9238 | Epson America Inc. Perfection 636U 8.5X11.7 Color USB 600X2400 | 1 | 148.00 | $148.00 | $25.00 | Sparco.com |
| 10/25/99 11:33:10 PDT | 6811 | 3DFX 3DFX 1000 PCI 12MB VOODOO2 DIRECT 3D/GLIDE FOR GAMING | 1 | 55.00 | $55.00 | $20.00 | Sparco.com |
| 10/29/99 05:21:52 PDT | 11518 | Asus 50X READER EIDE ATAPI 128K 150MS 7500KB/SEC, RETAIL BOX | 1 | 28.00 | $28.00 | $22.49 | Sparco.com |
| 11/09/99 07:08:18 PST | 12831 | Castlewood Systems ORB 2.2GB SCSI EXT REMOVABLE MEDIA DRIVE PC | 1 | 166.00 | $166.00 | $16.00 | Sparco.com |
| 11/09/99 11:00:13 PST | 15945 | Lexmark International Inc. Lexmark 3200 Jetprinter | 1 | 71.50 | $71.50 | $58.19 | Sparco.com |
| 11/09/99 01:34:54 PST | 16791 | Intuit Quicken Basic 2000 for Windows | 1 | 25.00 | $25.00 | $7.00 | Sparco.com |
| 11/09/99 05:51:49 PST | 16842 | SOUND BLASTER LIVE PLATINUM SOUND CARD | 1 | 104.39 | $104.39 | $68.61 | Sparco.com |
| 11/10/99 06:19:35 PST | 13156 | AGFA EPHOTO CL30 DIGITAL CAMERA 1440X1080 LCD/VIEW/30BIT/USB/PCMAC 4MB | 1 | 270.67 | $270.67 | $36.33 | Sparco.com |
| 11/10/99 06:20:41 PST | 15545 | Targus Universal Carrying Case | 1 | 104.00 | $104.00 | $30.00 | Sparco.com |
| 11/10/99 07:15:59 PST | 16433 | Maxtech FHX-4 4 PORT DUAL SPEED FAST ENET HUB | 1 | 39.00 | $39.00 | $31.29 | Sparco.com |
| 11/11/99 04:24:11 PST | 15970 | Compaq COLOR INK CARTRIDGE A900 IJ300/IJ700/IJ750/IJ900 | 2 | 19.50 | $39.00 | $23.00 | Sparco.com |
| 11/11/99 07:24:52 PST | 16902 | Microstar 440BX SLOT1 UPTO 768MB ATX 5PCI, 2ISA, 1SH AGP SUPER P3 | 1 | 73.00 | $73.00 | $30.95 | Sparco.com |
| 11/11/99 11:28:22 PST | 15542 | Adaptec EZ CD CREATOR CD DELUXE V4.0 | 1 | 54.00 | $54.00 | $23.00 | Sparco.com |
| 11/11/99 12:45:32 | 11840 | 32X/4X/4X REWRITABLE EIDE INT W/CD SW CDR & | 1 | 113.00 | $113.00 | $74.00 | Sparco.com |

 NexTag.com<sup>SM</sup> Fig. 33 (interface 3300) ORDERS

Home | Help & FAQ | User: spiffer@nextag.com | Signout

| Dashboard | Business Rules | Accepted Bids | Orders |

◯ New Orders   ● In Progress Orders   ◯ Completed Orders

| Date | Buyer | Brand/Model | Units | Unit Price | Subtotal | My Promo | Merchant |
|---|---|---|---|---|---|---|---|
| 11/26/99 06:04:52 PST | testbug2@mail.com | Timeline | 1 | 7.24 | $7.24 | $10.48 | AlphaCraze.com |
| 11/26/99 06:38:12 PST | testbug1@mail.com | Customers.Com | 1 | 7.24 | $7.24 | $8.16 | AlphaCraze.com |
| 11/27/99 11:17:14 PST | testbug@mail.com | Harry Potter & the Chamber of Secrets | 1 | 7.70 | $7.70 | $4.80 | A1books.com |
| 11/28/99 10:32:00 PST | vsavvich@nextag.com | HP Omnibook 4150 | 1 | 3793.00 | $3793.00 | $1.00 | Egghead.com |
| 12/02/99 02:03:18 PST | komaxa@mail.com | Blue Ladies (1934-1941) | 1 | 13.46 | $13.46 | $0.71 | CDWorld |
| 12/02/99 02:25:45 PST | kyezzu@nextag.com | Brand New Day* [9/28] | 1 | 11.94 | $11.94 | $0.63 | CDWorld |
| 12/02/99 02:35:52 PST | co6ako@yahoo.com | Blue Ladies (1934-1941) | 1 | 13.46 | $13.46 | $0.71 | CDWorld |
| 12/02/99 10:56:28 PST | tomi@nextag.com | Perfectly Frank | 1 | 7.60 | $7.60 | $0.40 | CDWorld |
| 12/02/99 10:56:35 PST | tnt@yahoo.com | Songbook: A Collection Of Hits | 1 | 13.46 | $13.46 | $0.71 | CDWorld |
| 12/02/99 10:56:28 PST | komaxa@mail.com | The Great Composer - He Wrote And Played Them All | 1 | 7.10 | $7.10 | $0.37 | CDWorld |
| 12/02/99 10:58:07 PST | tomi@nextag.com | Lush Life: Joe Mooney's Songs [9/21] | 1 | 8.55 | $8.55 | $0.45 | CDWorld |
| 12/02/99 11:08:05 PST | komaxa@mail.com | Eight String Swing | 1 | 1.92 | $1.92 | $0.80 | CDWorld |
| 12/03/99 04:16:55 PST | acy@mail.com | Matrix | 1 | 0.89 | $0.89 | $17.98 | CDWorld |
| 12/03/99 05:02:34 | kyezzu@nextag.com | Matrix | 1 | 0.89 | $0.89 | $17.98 | CDWorld |

 NexTag.com℠ Fig. 34 (interface 3400) ORDERS

Home | Help & FAQ | User: spiffer@nextag.com | Signout

Dashboard | Business Rules | Accepted Bids | Orders

○ New Orders  ○ In Progress Orders  ● Completed Orders

| Date | Buyer | Brand/Model | Units | Unit Price | Subtotal | My Promo | |
|---|---|---|---|---|---|---|---|
| 10/06/99 09:52:24 PDT | 3333 | 3Com PALM V HARD CASE | 1 | 20.05 | $20.05 | $7.94 | H |
| 10/06/99 10:26:13 PDT | 6652 | 3Com PALM IIIX | 1 | 218.55 | $218.55 | $33.44 | H |
| 10/06/99 10:34:21 PDT | 6573 | Adaptec EZ CD CREATOR CD DELUXE V4.0 | 1 | 59.30 | $59.30 | $14.69 | H |
| 10/06/99 10:35:30 PDT | 5448 | FrontPage.2000.CD.V/UPG. | 5 | 27.30 | $136.50 | $103.45 | H |
| 10/06/99 10:49:58 PDT | 7085 | Cables To Go Fast Wide SCSI - Internal Ribbon Cable | 1 | 26.05 | $26.05 | $5.94 | H |
| 10/06/99 10:51:49 PDT | 6268 | Microsoft Corporation Microsoft Money 2000 Deluxe | 1 | 27.05 | $27.05 | $26.94 | H |
| 10/06/99 11:04:33 PDT | 6573 | HI-VAL CD-RW REWRITABLE MEDIA 650MB 74MIN RETAIL BOX 10-PK | 1 | 13.55 | $13.55 | $10.44 | H |
| 10/06/99 11:24:04 PDT | 5837 | Logitech QuickCam VC | 1 | 22.30 | $22.30 | $39.69 | H |
| 10/06/99 11:56:57 PDT | 3670 | CDR PLATINUM 25 PACK SLEEVE CDROM | 2 | 26.80 | $53.60 | $8.38 | H |
| 10/07/99 12:06:49 PDT | 2237 | Castlewood Systems ORB 2.2GB SCSI EXT REMOVABLE MEDIA DRIVE MAC | 1 | 146.55 | $146.55 | $26.44 | H |
| 10/07/99 02:14:59 PDT | 6263 | CRUCIAL TECHNOLOGY 64MB MODULE FOR MICRON TRANSPORT XKE P233(A) | 1 | 110.80 | $110.80 | $12.19 | H |
| 10/07/99 02:49:35 PDT | 2750 | HP 5PK Tape Cartridge | 1 | 84.30 | $84.30 | $39.69 | H |
| 10/07/99 04:26:53 PDT | 4859 | THE LEARNING CO CYBERPATROL SINGLE 1-DOC | 3 | 11.03 | $33.09 | $59.88 | H |
| 10/07/99 04:28:41 PDT | 4859 | Microsoft Corporation IntelliMouse Explorer | 3 | 31.70 | $95.10 | $78.87 | H |

METHODS AND APPARATUS FOR FACILITATING TRANSACTIONS

RELATED APPLICATION DATA

The present application is a continuation-in-part of commonly assigned, U.S. patent application Ser. No. 09/401,119 filed Sep. 21, 1999, now abandoned and claims priority from commonly assigned, U.S. Provisional Application No. 60/157,552 filed Oct. 4, 1999. Both applications are incorporated herein by reference for all purposes.

The present application also describes subject matter related to subject matter described in commonly assigned, copending U.S. patent application Ser. No. 09/265,511 filed Mar. 9, 1999, commonly assigned, U.S. Provisional Application No. 60/117,118 filed Jan. 25, 1999, and commonly assigned, U.S. Provisional Application No. 60/129,846 filed Apr. 16, 1999, the entireties of which are incorporated herein by reference for all purposes.

BACKGROUND OF THE INVENTION

The present invention relates to electronic commerce via the Internet. More specifically, the present invention relates to the facilitation of transactions between buyers and sellers on the World Wide Web.

Electronic commerce on the Internet, and specifically the World Wide Web, promises to transform the economic landscape in ways which have not yet been contemplated. Consumers and corporate buyers already have online access to a staggering variety of goods and services from a wide range of merchants and service providers. They may electronically search through vast inventories to easily and conveniently find products to fit their needs, often at a significant savings over traditional commerce. They may also initiate and complete transactions online simply by identifying a product and submitting a payment identifier such as a credit card or purchasing account to the appropriate web site.

Electronic commerce also offers a number of advantages to the merchant or service provider. Offering products online avoids all of the overhead associated with operating retail or wholesale locations. In addition, online sellers do not need to anticipate the inventory needs of a number of different geographic locations. In fact, inventory may be centralized and precisely and automatically monitored and adjusted according to transaction data which are gathered virtually instantaneously. Moreover, the World Wide Web has the potential for making a particular seller's goods or services available to anyone, any time, anywhere on the planet. The cost savings and the market access associated with these advantages combine to give online sellers a significant competitive edge over their more traditional counterparts.

Given the obvious potential of electronic commerce and the rapidly increasing traffic at web sites engaging in electronic commerce, it's no surprise that there is a demand for technical solutions by which electronic commerce transactions may be facilitated and made more efficient. Such solutions range from increasing the speed and efficiency with which data are transferred over the Internet to improving search engine capabilities to creating more user-friendly interfaces. Unfortunately, all of the solutions presented to date have not been able to reproduce an important part of traditional commerce and its attendant advantages for both sellers and buyers. That is, none of today's electronic commerce solutions allows for the give and take of a traditional negotiation between individual sellers and buyers.

An example of one solution for facilitating transactions between a buyer and one or more sellers is described in U.S. Pat. No. 5,794,207 for METHOD AND APPARATUS FOR CRYPTOGRAPHICALLY ASSISTED COMMERCIAL NETWORK SYSTEM DESIGNED TO FACILITATE BUYER-DRIVEN CONDITIONAL PURCHASE OFFER issued on Aug. 11, 1998, the entirety of which is incorporated herein by reference for all purposes. In that patent, a system is described by which a prospective buyer communicates a binding purchase offer globally to a plurality of sellers. The offer is made binding by requiring the buyer to submit a payment identifier such as, for example, a credit card. Any of the potential sellers may then bind the buyer by accepting the offer.

It is clear that such a solution does not resemble a traditional negotiation. In traditional situations, a prospective buyer can make a conditional offer which may be countered by the seller which may again be countered by the buyer. Traditionally, neither party is bound until both agree upon a price. In this way, the exact price may be identified at which a transaction could proceed as between the two specific parties. It will be understood that the ability to identify this price for any two parties in an efficient manner would be of potentially great value to both buyers and sellers. That is, buyers would be getting the product they want for the price they are willing to pay, while sellers would be effecting a greater number of sales due to their ability to engage in price discrimination.

There are, however, some attendant disadvantages associated with allowing buyers to submit non-binding bids. For example, if there are no consequences to the buyer for submitting a bid, many bids may be submitted by a single buyer or a small group of buyers solely for the purpose of manipulating the market for a particular product. Moreover, resources may be wasted by a seller in pursuing a proliferation of non-serious bids. As discussed above, one solution is to require that a buyer submit a credit card number before he may submit a bid, and further to assess some financial penalty against the buyer's credit card if the buyer abandons the negotiation. Unfortunately, this may serve as a barrier to entry for many buyers in that they are much less likely to conduct simultaneous negotiations with a number of merchants under these conditions.

It will also be understood that, in a negotiated market where sellers are indicating the price they are willing to pay and buyers are naming their price, deals cannot happen if neither of the parties is willing to meet the other's price. At the same time, there are many interested third parties that would like such deals to happen for a variety of reasons. These third parties could include, for example, the entity that owns the network or site in which the negotiations are happening, or manufacturers or distributors of the product being sold by the seller. One common mechanism to encourage the consummation of such transactions is the providing of promotions, e.g., coupons, by the interested third party. However, in a negotiated market, especially one on the Internet, the logistics of enabling such promotions becomes quite complicated due, in part, to the fact that buyers may not be aware of all promotions such third parties may be offering. In addition, many manufacturers or distributors would like the ability to run very short, precise promotions based on their current inventory levels, product life cycle, or even just the perceived benefit of getting a particular buyer to adopt their brand.

It is therefore desirable to provide an electronic commerce solution by which individual buyers may negotiate online in a traditional and non-binding manner with one or more sellers. It is also desirable to provide techniques in the electronic commerce environment by which interested third parties may facilitate consummation of specific transactions which might not otherwise be consummated.

SUMMARY OF THE INVENTION

According to the present invention, an electronic commerce solution is provided for facilitating online transactions which allows traditional negotiation between a buyer and a seller to occur. According to a specific embodiment, a web site is provided having individual private graphical user interfaces, e.g., web pages, for buyers and sellers. A buyer gains access to his private interface with a user ID and password, although other areas of the web site are accessible without the user ID or password. The buyer's interface allows him to search a proprietary database for current product information for a variety of products being offered for sale by a number of sellers. The product information includes, for example, the name of the seller and an ask price and/or a list price for the product as specified by the seller. The buyer may save the product information for any products in which he is interested to one or more shopping lists which become part of his interface. According to specific embodiments, and as will be described, product information is the proprietary database may be supplemented or replaced with more current product information which is retrieved by a parser from multiple remote sites such as, for example, the sites of the merchants themselves.

According to specific embodiments, methods and apparatus are provided which enable one or more interested third parties that want a particular deal to happen to make it happen. Each such third party logs into a private third party interface on the web site of the present invention with which he views all or some subset of the currently open bids in the system. The third party may then select specific bids for which he would like to enable acceptance. According to a specific embodiment, the third party can look at the spread or other attributes of the potential deal (e.g., buyer information, seller information, and product information for the product under consideration or related products) to help him in making his decisions. A third party may enable acceptance of a particular bid by, for example, making up all or some of the difference between the buyer's bid and the seller's asking price. Where the third party makes up only some of the difference, the seller may accept or counter the augmented bid. Alternatively, another third party can make up all or some of the remaining difference.

According to various embodiments, when acceptance is enabled in this way, the buyer sees that their bid price has been met by the seller and can therefore go ahead and continue the steps towards completing the transaction. The fact of the acceptance is also made visible to the seller who gets paid the original bid price by the buyer and some additional amount by the one or more third parties, so that the total price they get is equal to their indicated seller price. That is, the buyer gets the deal at their price, the seller gets their asking price, and the difference is picked up by the third party(ies).

According to a specific embodiment, the buyer may share his shopping list(s) with friends or co-workers to solicit feedback on the various products, sellers, ask prices, etc. The shopping list may be sent in an e-mail as, for example, an HTML table in which the addressee may insert his comments. Alternatively, persons from whom feedback is desired may be notified by e-mail and given access to the buyer's shopping list on the web site itself. In this way, a buyer may solicit advice or approval before initiating a transaction.

For each product saved in the shopping list a bid button is provided, activation of which causes a bid interface to be presented by which the buyer may submit a non-binding bid to the seller of that particular product. Alternatively, the bid interface may be in the shopping list itself. As yet another alternative and as will be discussed, bids may be submitted without the use of such a shopping list. That is, a bid may be submitted, for example, through an interface accessible from the product search results.

According to a specific embodiment, a bid submitted by any of these various techniques is made available to a number of different sellers offering the same product. The sellers are "different" in that they include a large number of independent economic entities. This is to be distinguished from other sites in which the "sellers" are all just representatives of a single economic entity. Making the bids available to different economic entities increases the likelihood that at least one of them can offer a price acceptable to the buyer. Using the shopping list or other bid interfaces, the buyer may make a number of bids for the same or different products to a number of different sellers simultaneously.

The bids made available to the sellers may be of different characters in that a buyer may indicate that her bid is related only to the product price or includes any applicable taxes and/or shipping amounts. That is, a buyer may indicate that her bid is for the product price with any applicable taxes and/or shipping costs added in. The transaction site of the present invention then presents an appropriately adjusted bid amount to the sellers which may vary from seller to seller. That is, if the buyer indicates that taxes and shipping are included in the bid, for each seller, the transaction site subtracts a shipping amount and any applicable taxes for each seller using shipping information from each of the sellers and relevant tax information. The adjusted bid amount may then be easily compared to the seller's product cost.

According to a specific embodiment of the invention, even though the buyer's bids are non-binding, there is nevertheless a consequence for submitting frivolous bids. That is, the transaction site of the present invention may be configured to track a buyer's "reputation" by tracking the buyer's transaction behavior. For example, the number of bids submitted by a particular buyer could be related to the number of bids honored or reneged upon by that buyer, and an objective value could be generated therefrom indicative of the buyer's "reputation." According to a specific embodiment, the metric is simply the number of offers honored less the number reneged, a large positive value representing a "good" reputation and a large negative value representing a "bad" one. According to another embodiment, the metric is based on the number of times a buyer honors acceptance of his bids. According to yet another embodiment, the metric is based on the percentage of the buyers bids which are eventually consummated. It will be understood that a variety of data could be used to generate a metric indicative of a buyer's transaction behavior and that the present invention is not limited to the few examples described here.

Each buyer's reputation is made available to sellers on the site for use as they see fit. For example, a seller could choose to respond only to bids from buyers who have a reputation which is of a certain level. Alternatively, a seller could choose to respond unfavorably to such buyers, thus giving the buyer immediate feedback and incentive to adjust her bid accordingly. In addition, a seller could give preferential treatment, e.g., discounts, to buyers with very good reputations. Thus, buyers would tend to conduct transactions in a responsible manner to protect their reputations from being damaged and to receive preferential treatment. This approach has many of the advantages of requiring a credit card or other payment identifier without presenting a significant barrier to entry and without making simultaneous negotiation impracticable.

Each seller having products in the proprietary database also has access to a private interface on the web site with which an authorized representative of the seller may have access to all of the currently outstanding bids to that seller for any of the products offered by the seller. According to a specific embodiment, bids to other sellers for products offered by the seller are also available on the seller's private interface. The seller may respond manually to any of the posted bids or, alternatively, the seller may specify a set of business rules according to which automated responses to the posted bids are generated. The response to a bid may be an acceptance of the bid or a counteroffer.

According to various embodiments, market information is displayed along with the list of current bids to help the seller with responding to any or all of the bids, i.e., decision-making support. In one embodiment, demand data are graphically presented, i.e., in a demand curve, representing bids for a particular product to either the particular seller, or a number of different sellers. The seller (or the business rules specified by the seller) can then use the demand data to develop a strategy for responding to one or more bids. For example, a seller can determine how much to temporarily lower an ask price to effect a block deal.

Any bid responses from any sellers show up in the buyer's private interface. According to one embodiment, the responses show up in the shopping list juxtaposed with the original ask price, i.e., the list price, and the buyer's bid. If the seller's response is an acceptance of the buyer's bid, the buyer is enabled to complete the transaction if he so chooses. According to a particular embodiment, this is accomplished by means of an HTML link to the seller's web site. Alternatively, the transaction site can make the buyer's payment and shipping information available to the seller. If, on the other hand, the seller's response is a counteroffer, the buyer may continue the negotiation in the manner described above until a mutually acceptable price is reached, or until the buyer or the seller terminates the negotiation.

As alluded to above, the buyer may conduct a number of simultaneous negotiations with different sellers for the same product or even multiple products. Therefore, according to a specific embodiment, a mechanism is provided by which negotiations with a number of sellers may be automatically terminated when the buyer reaches an agreement with any one seller. That is, the buyer may create a mutually exclusive group with which a plurality of outstanding bids and/or quote solicitations are associated. According to a specific embodiment, the buyer creates a mutually exclusive group by designating one of his shopping lists as such a group. According to another specific embodiment, a mutually exclusive bid group is automatically created by the system when the buyer posts bids for a particular product to more than one seller, or where the buyer posts bids for more than one equivalent or similar products to one or more sellers. When an agreement is reached on any one of the bids or quote solicitations in a mutually exclusive group, all other negotiations for the products in the group are automatically terminated. According to various embodiments, such a mutually exclusive group can correspond to a variety of product-seller combinations. That is, a mutually exclusive group can identify one product and multiple sellers, multiple products and multiple sellers, multiple products and one seller, etc. This feature allows a buyer to place a number of simultaneous bids even though he intends to make only a single purchase. As will be described, the mutual exclusivity feature of the present invention is also made available in the auction context.

Thus, the present invention provides methods and apparatus for facilitating transactions in a wide area network. Information relating to a transaction between a first party and a second party is provided to a third party via the wide area network. The third party is then enabled to facilitate consummation of the transaction between the first and second parties via the wide area network. According to a specific embodiment, the information includes a bid price associated with the first party and an ask price associated with the second party, the third party being enabled to cover at least part of a difference between the bid and ask prices via the wide area network.

According to another embodiment, methods and apparatus are provided for facilitating transactions in a wide area network. Information relating to a plurality of bids on a transaction site is selectively provided to a third party via the wide area network. A first one of the bids involves a first party and a second party, and includes a bid price associated with the first party and an ask price associated with the second party. A response is transmitted from the third party to the first party via the wide area network. The response covers at least part of a difference between the bid and ask prices. The second party is notified of the response via the wide area network.

A further understanding of the nature and advantages of the present invention may be realized by reference to the remaining portions of the specification and the drawings.

BRIEF DESCRIPTION OF THE DRAWINGS

FIGS. 3-18 are a series of graphical user interfaces illustrating the operation of a specific embodiment of the invention;

FIGS. 19-25 are a series of graphical user interfaces illustrating the operation of another specific embodiment of the invention; and FIGS. 26-34 are a series of graphical user interfaces illustrating the operation of yet another specific embodiment of the present invention.

DESCRIPTION OF SPECIFIC EMBODIMENTS

Figure 1:
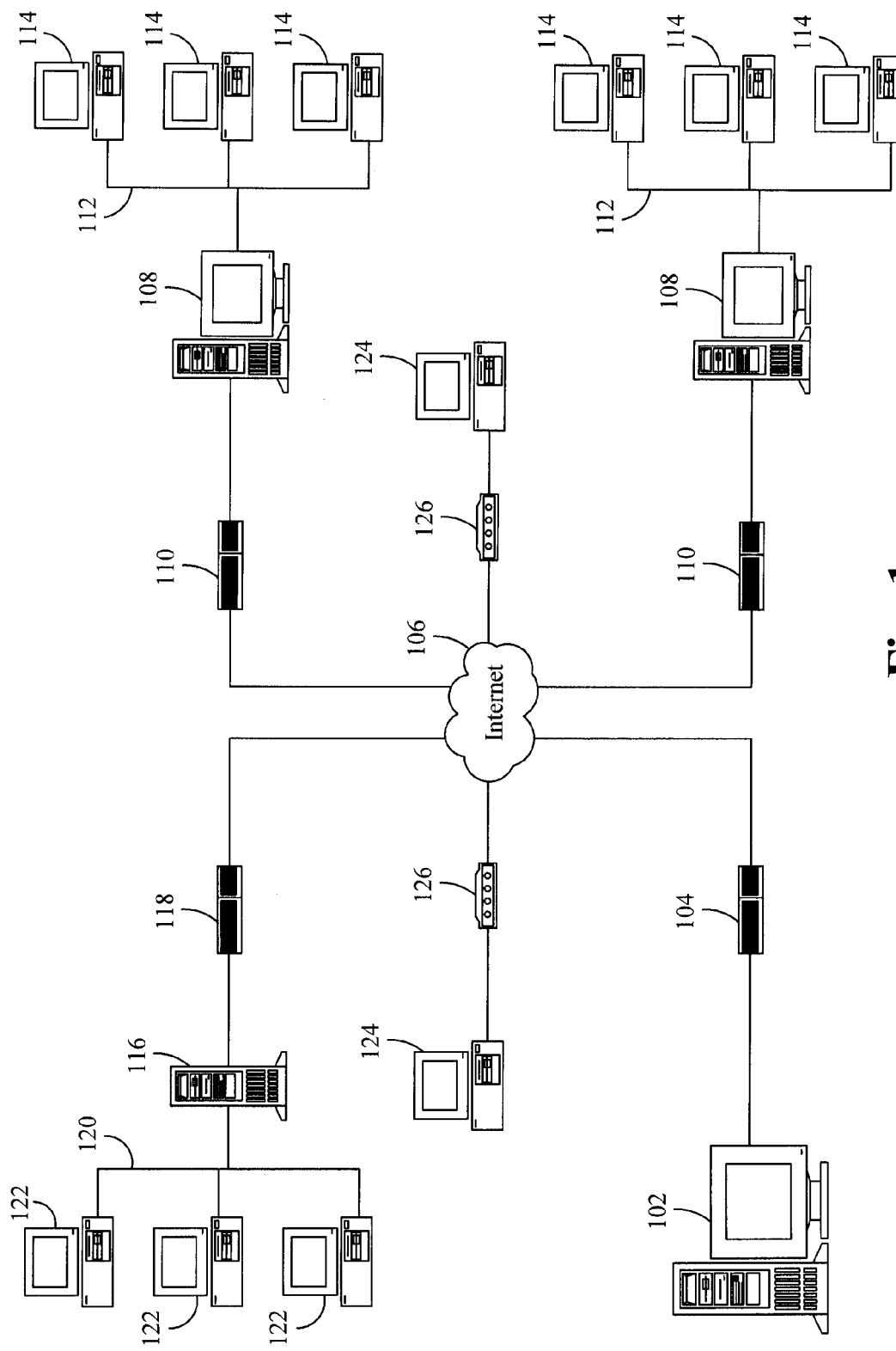
FIG. 1 is a block diagram of a hardware environment in which the various embodiments of the present invention may be implemented.

FIG. 1 is a block diagram of a hardware environment in which the various embodiments of the present invention may be implemented. The web site at which transactions between buyers and sellers are facilitated according to the invention is located on a server 102 which is connected by a router 104 to the Internet 106. Sellers (represented by servers 108) are connected to the Internet via routers 110. Seller servers 108 may have networks 112 associated therewith interconnecting a plurality of personal computers or work stations 114. Buyers (represented by computers 122 and 124) may be connected to the Internet in a variety of ways. For example, a buyer may be connected from his home via a modem 126, or from his workplace via a network 120, a file server 116, and a router 118. It will be understood that, according to various embodiments of the invention, buyers and sellers may gain access to the web site on server 102 via a variety of hardware configurations. For example, a seller may be an individual on his home computer 124. Similarly, a buyer may be an employee may be at his computer 114 at a corporation which is also a seller. It will also be understood that the hardware environment of FIG. 1 is shown for illustrative purposes and that a wide variety of hardware environments may be employed to implement the various embodiments of the present invention. It should also be understood that specific embodiments of the methods and processes described herein are implemented as computer program instructions, i.e., software, in the memory of server 102.

Figure 2:
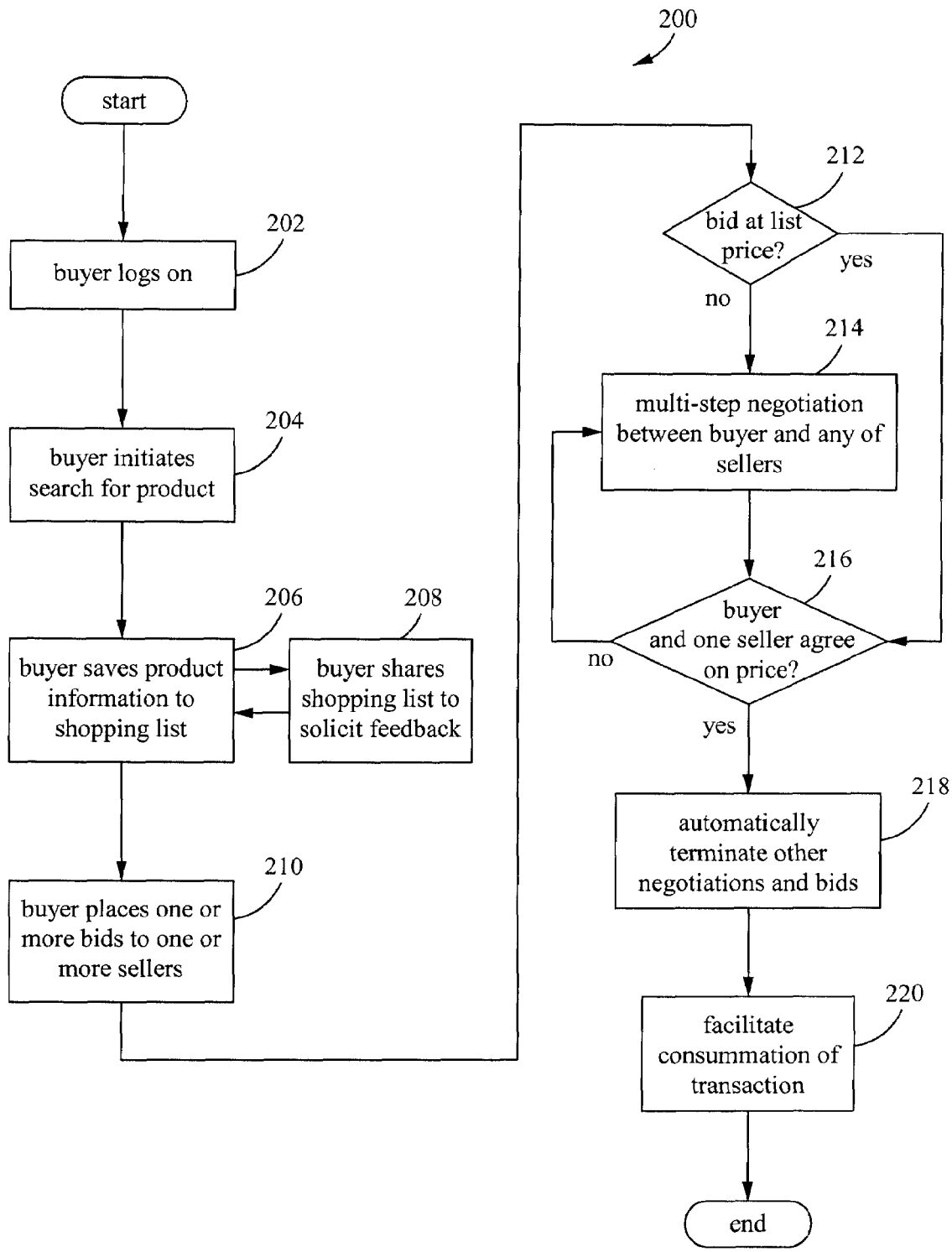
FIG. 2 is a flowchart illustrating facilitation of a transaction according to a specific embodiment of the invention.
Figure 2A:
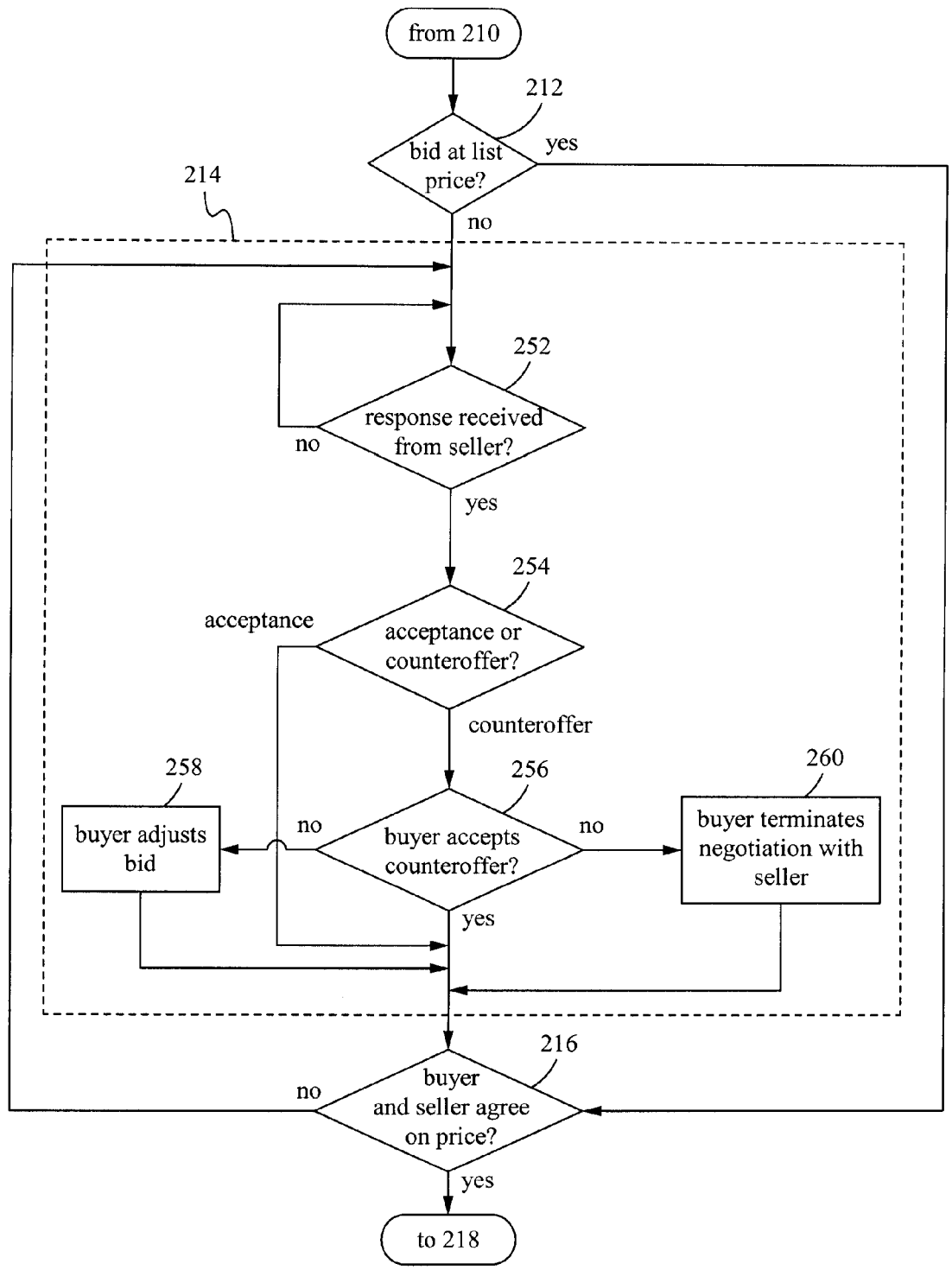
FIG. 2a is a flowchart illustrating a negotiation between a buyer and a seller according to a specific embodiment of the invention.

The operation of a specific embodiment of the invention will now be described with reference to FIGS. 2-18. FIG. 2 is a flowchart 200 illustrating facilitation of a transaction according to a specific embodiment of the invention. FIG. 2a is a flowchart illustrating a multi-step negotiation between a buyer and a seller (see 214 of FIG. 2) according to a more specific embodiment of the invention. FIGS. 3-18 are a series of graphical user interfaces which will be used to illustrate the transaction process of FIGS. 2 and 2a.

Initially, a buyer logs on to the transaction facilitation system of the present invention (202) via login interface 300 of FIG. 3. This results in presentation of a personalized private interface 400 to the buyer in which the buyer may initiate a search for a particular product (204). According to various embodiments, a buyer need not log on to the site before initiating a search. That is, searching may be initiated by individuals who are not members of the transaction site. According to such embodiments, logging in is only required for bidding, negotiating, transacting, etc. To focus the search, the buyer may specify the product type as, for example, a laptop computer as shown in interface 400 of FIG. 4. The buyer may further specify the type of laptop (e.g., ThinkPad® 600) to varying degrees of specificity in the Keyword(s) window. More advanced searching options are also available for more skilled users and more focused searches in which a variety of product criteria may be specified.

As will be understood, the search for a desired product may be effected in a variety of ways. For example, like price comparison services, e.g., shopping engines, on the web today, the search may employ either a database which allows multi-merchant price comparisons, or a parser, e.g., a shopping bot, which sends search requests to multiple merchant sites and then returns the results from those sites to the searcher. In general the database approach allows a more tightly controlled parametric search than the parser approach. On the other hand, the parser approach provides real time data. Thus, the database approach is more likely to lead to obsolete prices and stock status. On the other hand, parsers tend to generate less satisfactory search results and are generally slower in that the results must be returned from multiple remote sites, compiled, and then sent to the searcher.

According to a specific embodiment, methods and apparatus are provided by which advantages of both of these search methods are realized. That is, according to this embodiment, a database is initially used to define the search. The buyer thus gets an excellent search output based on the parametric search criteria he has defined. Then once the buyer has identified the product or products of interest he can get real time prices and stock status for the product(s) through the use of a parser or shopping bot which interrogates the web sites of the merchants associated with the selected product(s).

Thus, according to one such embodiment, as soon as the buyer selects a product, the web pages of the merchants associated with the selected product are accessed and parsed to extract current price and stock status information. This information is then displayed to the buyer. According to various embodiments, this may be done automatically when the buyer selects a product, or alternatively, only after a buyer explicitly asks for a "real-time update". According to one embodiment, in the case where the buyer must explicitly request the real-time update, price and stock status information from the transaction site database is displayed to the buyer until the real-time data are requested.

When the buyer finishes specifying the product and clicks on "Go," a search of a proprietary database is initiated in response to which relevant product information is presented in the form of a list of products as shown in interface 500 of FIG. 5. Each entry in the list includes the manufacturer, specific product information, and a product price (e.g., the "Lowest Price" column which displays the lowest list price from among the sellers selling the specific product via the transaction site). It should be noted that the term "ask price" as used herein encompasses any price for which a merchant is offering a product for sale including, for example, the list price and subsequent counteroffer prices. The term "list price" is used herein in its conventional sense in that it generally refers to an original price associated by the merchant with a product. As mentioned above, and according to a specific embodiment of the invention, when the list of products shown in interface 500 is initially presented, the price shown for each entry is the lowest list price for the product from among the sellers selling through the transaction site.

Also included with each entry is a "Save" button by which the buyer may save any of the list entries to any of his personal shopping lists (described below) from which transactions may be initiated. Alternatively, transactions may be initiated directly from the search results list. As shown in FIG. 6, when any of the active "Save" buttons in the product information list of interface 500 are activated, i.e., the buyer clicks on them, the associated product information is saved to the buyer's currently selected shopping list (206) and the active "Save" button becomes a display object indicating that the associated item has been saved. Additional information about any of the products in the list of interface 500 may be obtained by clicking on the HTML text describing the product. According to a specific embodiment, creation of such a shopping list may be accomplished without logging in to the transaction site. However, the entries in such a list are not permanently saved and transactions may not commence until the user logs in.

According to various embodiments, a buyer can create and simultaneously maintain as many shopping lists as desired. Moreover, for each shopping list created, the buyer may specify a variety of attributes which affect the way in which each shopping list is used to facilitate transactions. For example, the buyer may specify whether the entries of a particular shopping list are independent of each other or whether they form a mutually exclusive group as described herein. If the buyer specifies that the entries are independent, then the bids and deals associated with any one entry have no effect on ongoing negotiations for other items in the list. In addition, the buyer may specify whether a particular item will automatically solicit quotes from a plurality of sellers once a corresponding entry is added to one of the buyer's shopping lists. The buyer may also customize each shopping list by, for example, giving each list a meaningful name, or by associating comments with each.

Interface 500 also includes an advanced search interface in which specific parameters associated with the specified product type may be specified. In the example shown, for the product type "Laptop" the processor, the display size, and the speed may be specified to further refine the search.

The shopping list to which the buyer saves selected portions of the product information is shown in interface 700 of FIG. 7. The shopping list includes the information from the search results list of interface 500. In addition, a "Comments" feature is provided which allows the buyer or other individuals authorized by the buyer to insert personal comments regarding each specific product or merchant. Such comments could include full text messages or, for example, product or merchant ratings. Insertion of comments by the buyer is effected by activation of a "Comments" button in each shopping list entry. This results in presentation of window (not shown) in which new comments may be entered or old comments edited.

Insertion of comments by other individuals may be accomplished in different ways according to various embodiments of the invention. According to one embodiment, the buyer may e-mail an HTML page including the shopping list to one or more individuals in a reviewer network to solicit comments (208). The individuals receiving the shopping list may view the page using their Internet browser and, through an HTML link in the page, access the transaction web site as a user authorized to add comments to the buyer's shopping list. As discussed above, these comments may be full text messages regarding anything relevant to the listed product or merchant. Comments may also take the form of a rating of the product or merchant according to a scale automatically provided to the reviewers in the reviewer network. According to specific embodiments, the system of the present invention automatically compiles ratings from the buyer and reviewers to create indices which may be used for decision making.

Alternatively, the reviewer may insert comments into the HTML page and e-mail it back to the web site for automatic entry into the buyer's shopping list. According to another embodiment, the buyer gives permission for others in his reviewer network to review one or more of his shopping lists by specifying a plurality of e-mail addresses for each shopping list. The buyer may then exchange comments about various products and merchants via an interface on the web site with his reviewers and others who have been authorized to review by that buyer.

Activation of the HTML text describing a product entry in the shopping list of interface 700 results in presentation of an interface 800 (FIG. 8) which provides information about all merchants offering the particular product for sale through the transaction site. The first entry in the list corresponds to the shopping list entry selected in interface 700. Any of the entries in interface 800 may be saved to the original shopping list of interface 700 by activation of the associated Save button.

As can be seen, the buyer may submit an individual bid to a particular seller for the listed product (210) by entering the bid amount in the Bid column and activating the associated Bid button. According to specific embodiments, password verification is requested when the Bid button is activated to ensure that the bid is authentic and authorized. The buyer may accept the seller's current ask price (which may or may not be the same as the list price) by activation of a button indicating "Buy." According to various embodiments, password verification is also required prior to sending such a response to the buyer. Bids for varying amounts may be submitted to different merchants as shown in expanded shopping list interface 900 of FIG. 9. The individual bids submitted via interfaces 800 and 900 are shown in the shopping list in an updateable and interactive column entitled "Bid Price." It should be noted that implementation of the present invention does not require that password verification be employed for every transaction. That is, such password verification may only be required for some actions such as, for example, initially logging into the system.

Also included in interface 900 is a column entitled "Comments" by which direct messaging between the buyer and the seller may be effected. As part of the bid submitted to the seller, the buyer may include full text messages through activation of the associated "Comments" button. The buyer may also indicate a length of time for which the associated bid is good, i.e., an expiration time. Alternatively, a buyer could indicate that the bid is "good to cancel," i.e., that the bid is valid until cancelled by the buyer. As another alternative, the bid could be specified by the buyer as a "fill or kill" bid, i.e., only responses for the exact product and quantity requested will be entertained. In one embodiment, these bid parameters are implemented using a column next to the bid price (not shown) where the user indicates the life of the bid. It should be noted, however, that a variety of mechanisms may be used without departing from the scope of the invention. According to various alternate embodiments, the shopping list includes other mechanisms by which these parameters may be specified and communicated to sellers. According to specific ones of these, the mechanisms by which such bid attributes are communicated are such that they are recognized by the automatic response algorithms employed by sellers on the transaction site.

The seller may respond to the messages with full text messages of its own. This allows both parties to the negotiation to move forward with more specific information. According to a specific embodiment, the seller may input such messages via its own interface as described below. According to another specific embodiment, the seller's comments are presented to the buyer in a window which appears upon activation of the "Comments" button of interface 900 along with comments from any reviewers in the buyer's reviewer network. The seller's comments could also appear in conjunction with a response generated either by the seller, its representative, or a program active on behalf of the seller.

Submitted bids which do not constitute acceptances of the sellers "Ask Price" (212) are made available to individual merchants along with quote solicitations via another set of interfaces on the transaction web site. From this point, a multi-step negotiation between the buyer and each seller may commence (214). The details of such a negotiation will be described with reference to FIG. 2a. When a representative of a member merchant logs in to the transaction web site using interface 1000 of FIG. 10, currently outstanding bids and/or quote solicitations are listed according to a filter or filters specified by the merchant (see interface 1100 of FIG. 11). For example, the merchant may elect to view bids to all merchants, to a particular subset of merchants, or only bids to that particular merchant. The merchant may also filter the list to show only bids or quote solicitations for certain products. The merchant may also specify that only bids within a certain percentage or dollar value spread be listed. In this example, the bids are sorted according to a buyer identification number shown in the "Buyer Id" column, the bids submitted by the buyer of interface 900 corresponding to buyer 147. In general, the merchant or its representative may use a variety of filters in combination to generate a list of particular product-buyer combinations which are currently open. It should be noted that the entries in interface 1100 may also include items saved in buyers' shopping lists for which bids or quote solicitations have not yet been submitted.

Once the seller selects a product in interface 1100 the seller can respond in a variety of ways. That is, the seller can accept the specific bid or make a specific counteroffer to the bidder corresponding to the selected product. The seller can also make block responses (in the form of deals or counteroffers) to all or some subset of buyers who have posted bids or quote solicitations for the selected product.

In addition to the bid listing, market information may be provided with interface 1100 which the merchant may use to formulate strategies for responding to any or all of the outstanding bids. For example, a demand curve for a particular product, e.g., the ThinkPad® 600, may be shown. Other market information might include price histories, bid histories, deal histories, etc. Moreover, the market information may be presented in a variety of forms such as graphically, in tables, in lists, and the like.

An example of how a merchant might use such market information will now be described. The merchant may use demand data to effect a block response. That is, the merchant can use the data to determine how much to temporarily lower its ask price to induce acceptance by a specific number of buyers. According to a specific embodiment, the merchant effects a block deal by temporarily lowering its ask price to a particular buyer to match the bid price submitted by that buyer thereby inducing acceptance by that buyer. Because the merchant's response is made in the context of a block deal, a number of responses are automatically generated to other buyers who have submitted bids at or above the particular buyer's bid thereby inducing acceptance. According to a specific embodiment, the ask price of the automatically generated responses correlate to or match the bid price of each of the other buyer's bids rather than the bid price of the particular buyer to whom the merchant specifically responds. It should be noted that, as with other aspects of the present invention, the merchant may respond to bids directed to the merchant as well as bids directed to other merchants.

According to a particular embodiment, when the merchant logs on to the system all bids currently outstanding to that merchant for a variety of products are shown in the format of interface 1100. The merchant may then select a particular product in the product column to view all currently outstanding bids for that product either to the merchant or to a plurality of merchants. The market information presented will be adapted according to the particular view. The market information may be employed by a particular merchant in a variety of ways for decision-making support. A particular use would depend upon the nature of the information. As described above, demand data could be used to effect block deals. Demand data or the price history for a particular product could be used to make adjustments to the merchant's list price. It will be understood that there are a wide variety of ways in which such market information could be used to enhance a merchant's decision making which are within the scope of the present invention.

According to another embodiment, instead of selecting a particular product, the merchant may select a particular buyer identified in the buyer column, in response to which all bids and/or quote solicitations from that buyer currently outstanding in the system to any merchant are presented to the merchant in a format similar to that shown in interface 1100. This may also include products which have been saved to one of that buyer's shopping lists and for which the buyer has not yet posted a bid but has indicated that she is willing to solicit quotes. This allows a merchant to offer bundle deals to particular buyers when such buyers are identified. For example, a buyer might be bidding on a laptop computer, extra battery packs, a printer, and a carrying case. The merchant may respond to the buyer with a bundle bid or counteroffer which reduces the ask price for any or all of the items if the buyer chooses to buy all of those items from that merchant. This gives merchants a very powerful tool for negotiating with individual buyers. The merchant selects the items in the buyer specific list which he would like to include in the bundle and either quotes individual ask prices to the buyer for the selected items, or a single price for all the products in the bundle. According to a specific embodiment, the individual quotes (i.e., ask prices) are prefixed with a letter "B" identifying them as part of a bundle. The seller can also offer to sell related (competitive or complementary) products as part of the bundle. The seller can thus suggest products to the buyer on which he can offer good deals. This "cross selling" allows the seller to make deals on products even where such products are not originally identified by the buyer.

According to a specific embodiment, the buyer is enabled to define such a bundle. That is, the buyer may save a group of products to a shopping list, identify the group as a bundle and submit a single bid (or a request for quotes) for the entire bundle.

As described herein, a buyer may also define mutually exclusive groups of the same or similar products only one of which is desired by the buyer. According to a specific embodiment, this is achieved by the buyer designating a particular shopping list listing the products as a mutually exclusive group. According to other embodiments, mutually exclusive groups are automatically created by the system when a buyer submits a bid for the same product to more than one seller, or for two or more similar products to one or more sellers. Once such a group is defined, a buyer may bid on a number of ThinkPad® 600 and 700 computers even though she only wants one. By identifying the computers (and thus their associated bids or quote solicitations) as part of a mutually exclusive group, the buyer activates a feature of the present invention which terminates negotiations for all other products in the group when the buyer has reached an agreement on any product in the group. It will be understood that, in the context of the bundle bid, this information would be useful for the merchant. Therefore, according to a specific embodiment of the invention, when a merchant is attempting to effect a bundle bid or counteroffer, the merchant is enabled to identify which of the bids and/or quote solicitation associated with the buyer are part of a mutually exclusive group. According to a specific embodiment, in the list of bids and/or quote solicitations associated with a particular buyer, an entry is associated with each which identifies the product as part of such a mutually exclusive group. This could be an entry in a column dedicated for this purpose, or as, for example, a prefix associated with each product which is part of such a group.

According to one embodiment, the mutually exclusive bid group feature of the present invention is made available to buyers in the auction context. That is, a buyer may designate each of a plurality of bids to different auctions as part of a mutually exclusive group, any remaining bids in a group being automatically withdrawn when any one of them is accepted. This feature enables buyers to bid for multiple auctions (English, Dutch or any other traditional auction approach) in parallel. According to another embodiment and as discussed above in the negotiation context, the system of the present invention automatically creates mutually exclusive groups in the auction context with reference to the objects upon which the buyer is bidding and the number of bids submitted. That is, a mutually exclusive group might be created, for example, when a buyer submits a bid for the same product to more than one auction, or for two or more similar products to one or more auction.

According to one embodiment of the invention, market information (not shown) is made available to individual buyers in interface 900 to help them develop bidding strategies.

As discussed above with regard to market information presented to a merchant, such information could include demand data, list price histories, bid price histories, deal price histories, etc. The information can be filtered with respect to particular products and particular merchants. A price history might include the minimum, maximum and median list prices offered by a particular merchant for a particular product. A price history might be used by a buyer to predict, for example, how much the price for a product might drop in the future. That is, the buyer might use the historical price decay to predict price decay for an upcoming period. For a new product, i.e., a product which has no price history, the buyer will have the option of identifying a similar product and using the price history data for that product.

Alternatively, the system of the present invention may automatically determine one or more similar products in response to a buyer requesting market information for a new product. According to a specific embodiment, the similar product may be determined with reference to a mutually exclusive group. Automatic identification of a similar product could be enabled by identifying similarity in brand name, category, or data regarding what products buyers and/or sellers have identified as equivalents in the past. A technique known as collaborative filtering may be used to identify similar products using such information. Where more than one similar product is identified, a list of the similar products is presented to the buyer from which the buyer may select the product he believes is the most similar to the product for which market information is desired.

A deal history might include prices at which a particular merchant or a plurality of merchants has sold different volumes of a particular product. Such deal prices could include deal prices for transactions effected through the transaction site by the merchant or merchants. The deal history could also include deal prices for transactions effected outside of the transaction site and provided to the transaction site by the individual merchants. All of this market information provides powerful tools for a buyer to determine how much she wants to bid for a particular product.

According to a specific embodiment, good deals are identified for the buyer based on a variety of market-related heuristics. Such heuristics include, for example, the ratio of the (median-minimum merchant price for a product) to the median product price. Another heuristic could be the price drop (or the price drop for the lowest price) over a recent period (day, week, month, etc.) expressed as a percentage of the median or lowest price. These deals could be identified for the buyer on a special area of the main page or a special page of the transaction site. Alternatively, the good deals are extracted from the buyer's search results. Even more specifically, the buyer has the option of sorting his search results using the available heuristics to order the product listings according to how good the individual deals are. It should be noted that a variety of heuristics may be used to identify "good deals." For example, the difference between the lowest price and the second lowest price could be used to indicate just how good of a deal is being offered by the seller offering the lowest price.

The merchant may effect a manual response to an individual bid (252) by selecting the corresponding entry in interface 1100. The bid need not be directed to the merchant. It may, in fact be directed to another merchant. That is, not only does each merchant have the opportunity to view bid information to other merchants, each merchant may also respond to such bids. According to a specific embodiment, the bid information relating to other merchants does not identify the merchants to which individual bids are directed. A negotiation between the buyer and the second merchant may then take place as described herein. In any case, selection of a particular entry in interface 1100 results in presentation of trading interface 1200 of FIG. 12 to the merchant by which the merchant may either accept the bid price or submit a counteroffer to the buyer by changing the ask price for that buyer. Other information included in interface 1200 includes details about the buyer including, for example, the buyer's e-mail address and any other information authorized for release by the buyer. Note that the merchant may effect a block deal by specification of the block ask price in interface 1200. The seller may insert comments to the buyer in conjunction with the bid response such as, for example, an expiration time for the new ask price. The expiration time may also be indicated through an additional field (not shown) the contents of which may be intelligently processed by the system of the present invention to effect automatic removal of the ask price at the appropriate time. In addition and as shown, market information regarding the current bids may be provided in interface 1200.

The seller may also authorize automated responses to bids (252) by specifying a number of business rules to govern the responses using interfaces 1300-1320 of FIGS. 13a-13k. According to the present invention, any number of business rules may be defined by the seller and may be executed in any sequence specified by the seller. For each rule, the seller defines a set of criteria and a set of actions to be taken when the set of criteria is satisfied. Any number of criteria may be defined and combined in a variety of ways using logical operators (e.g., AND, OR, NOT) and groupings. Examples of criteria include (but are not limited to) bid-list spread, product type or group, the number of units, the buyer's reputation, etc. Similarly, any number of actions may be specified. Examples of actions includes (but are not limited to) text responses, ask price reductions, bid acceptance, etc. Another possible action could be generation of an e-mail message to one or more e-mail addresses. This can ensure that the appropriate representative(s) of the seller can be made aware of attractive sales prospects as soon as they are available at the transaction site. The e-mail(s) can ensure this without requiring the seller's representatives to continuously monitor the transaction site. This is especially useful during the early stages of the transaction site when it has relatively low traffic and hence cannot justify continuous monitoring by the seller or its representatives. The seller may reach the various Business Rules interfaces by selecting the corresponding HTML link at the top of interface 1200. In interfaces 1300 and 1302, respectively, the seller may specify a percentage or dollar value spread relative to the current list price within which a response will be automatically given. That is, if a bid is not close enough to the list price, no response may be given. The amount by which the list price may be reduced may also be specified as a percentage of the current list price. Product specific and buyer specific response may be added via interfaces 1304 and 1306 to address issues related to specific products, or to favor preferred customers. Other information may be conveyed to the buyer as part of an automated response by means of a text entry box entitled "Text Response." As shown, the text could indicate an expiration period for the bid response.

FIGS. 13e through 13k show alternative interfaces for specifying and modifying business rules. As shown in interface 1308 of FIG. 13e, existing business rules are accessed through a list window entitled "Current Business Rules". Rules may be added and deleted from the list using the "Create New Rule..." and "Delete Current Rule..." buttons. The currently highlighted rule in the "Current Business Rules" window is specified in a window with the title of the current rule at the top of the box as shown. A variety of criteria are specified using the "add criteria" button as will be discussed below. A variety of actions to be taken if the criteria are satisfied are also specified using the "add action" button. In the rule illustrated in interface 1308, if a product which is the subject of a particular bid is part of a Hi Inventory product group (previously specified by the seller by selecting the HTML text "product set") and the bid-list spread is greater than or equal to 50%, the action taken is to respond to the bidder with the text message "Please be serious—your bid is less than half our list price." Similarly, in interface 1310, if the bid-list spread is between 10 and 50%, the actions taken are to reduce the ask price by 10% and present the text message "We have a great deal for you—we can offer you a 10% discount." Finally, as shown in interface 1312, if the bid is within 10% of the list price, an acceptance message is transmitted to the bidder. Other criteria could be specified such as, for example, the number of units bid upon (interface 1314). In addition, any combination of criteria may be specified such as, for example, the number of units, the bid-list spread, and the buyer reputation (interface 1316).

The mechanism by which a new business rule may be created will now be discussed with reference to interfaces 1318 and 1320 of FIGS. 13j and 13k. In response to selection of the "Create New Rule . . . " button, a blank rule box is presented (interface 1318) in which the seller may specify the title of the rule, the criteria which must be true for action to be taken (using the "add criteria" list), and the actions to be taken (using the "add action" list). Many different combinations of criteria may be specified and different combinations of actions may also be specified. In the example shown in interface 1320, the criteria specified include the buyer reputation and the number of units, while the actions specified include reducing the ask price by 10% and displaying a text message. So, if a buyer with a highly rated reputation bids on more than 10 units, according to the new rule, the ask price is reduced by 10% and a text message is presented stating, "Because of your excellent reputation, we are able to offer you a 10% volume discount." According to a specific embodiment, the business rules of the present invention automatically ensure that, regardless of the way in which a seller specifies its rules, the ask price will never be reduced below the bid price. That is, even where a 10% reduction in ask price is specified in the seller's rule, the actual price reduction may be less where the bid is within 10% of the original ask price.

In addition, the merchant may specify response behavior which employs the market information from interface 1100. For example, an automated block deal response may be specified. Business rules may also be specified in a manner which takes into account specific attributes of individual bids. For example, the seller's response to a bid may be made contingent upon the number of units requested in the bid. This allows sellers to automatically give volume discounts.

A variety of complex rules may be specified so that automated responses may be given to the majority of outstanding bids, even bids to other merchants. Rules may be combined in various ways and multiple rules based on different criteria may be simultaneously applied. According to specific embodiments of the present invention, business rules may be linked to files external to the transaction site at, for example, the merchants own file server. Such rules might incorporate proprietary information over which the merchant wishes to maintain control. For example, if a particular merchant wishes to employ a specific subset of rules for products on which the merchant has a 10% gross margin, the rule determination for a particular bid would require current information regarding the gross margins for the merchant's product line. Understandably, this is information which a merchant might want to maintain as confidential.

Thus, even though the seller may not be willing to share his gross margins with the transaction site, he might still be willing to query his database and identify all the products that meet his requirements for gross margins (or any other criteria like inventory position) and then save the list of products into a file. The seller can then upload this file containing the list of products to the transaction site so that the list could be used with business rules specified by the seller. The seller could also place this file on the Internet and allow the transaction site to get access for use with business rules. It should be noted that in a similar way the seller can also create lists for buyers (buyer sets) that identify list of buyers and then allow the transaction site to access these lists for use with the seller's business rules. By specifying links to the confidential or proprietary information in its business rules, the merchant can maintain the information on its own site while also using it to automatically effect transactions at the transaction site. It will be understood there are myriad rules which may be applied and combined according to the specific goals of a particular seller and that the examples given above are merely illustrative and should not be used to limit the scope of the invention.

Not only may the buyer receive a manual or automated response from the seller to which the bid was intended, he may also receive a response from another seller who had access to the buyer's bid information via their own private interface. In fact, according to specific embodiments of the present invention, some powerful market enhancements are made possible by enabling sellers to respond to buyers' bids in a flexible manner. For example, a seller could respond to a bid to itself or another seller for a first product by offering a better deal on comparable competitive product. This would allow a seller to compete for sales where it does not carry the specific product to which the bid was originally directed. It also allows sellers to offer preferred products which closely match or exceed the performance or specifications of the product in the original bid.

Another market enhancement made possible by providing other sellers' bid information and allowing flexible bid responses is related to the creation of bundle responses by the seller. As discussed above, a seller may create a bundle response from currently outstanding bids by a particular buyer. In addition and according to a specific embodiment of the invention, a seller may respond to a bid to itself or another seller with an offer for a related product. So, for example, if a buyer is bidding on a laptop computer, the seller can offer the buyer a carrying case for the laptop or extra battery packs at a reduced price, or even at no additional cost. This allows the seller to create a bundle which includes the product for which the buyer is bidding and one or more related products. Thus, the seller can identify and target markets for specific products without having to rely on the consumer's knowledge of or motivation to bid on such related products. The seller can also leverage its inventory in the related products to effect sales of the primary product.

Where the seller's response is a counteroffer (254), the counteroffer price appears as a modified ask price in both the merchant's bid list of interface 1100 and the buyer's shopping list of interface 900 as shown in FIGS. 14 and 15, respectively. According to a specific embodiment, entries in the shopping list of interface 900 for which a response has been received from the seller are highlighted in a contrasting color as shown. Where the buyer does not accept the seller's counteroffer, he may adjust his bid by entering a new bid price as shown in FIG. 16. By activating the "Bid" button for that entry in his shopping list the buyer then submits an adjusted bid (258).

Note that because the bid has been adjusted, it is treated like a new bid and the entry is no longer highlighted. Alternatively, the buyer may terminate negotiations with the seller at any time (260). In any case, where the buyer and seller have not yet agreed on a price (216), additional rounds of negotiating may take place as described above.

According to various specific embodiments of the invention, negotiation regarding the total price of a product between the buyer and seller is enabled. The total price of a product purchased over the Internet may include, for example, the list price of the product, applicable taxes, and seller shipping prices. Thus, according to the invention, the bargain struck between the buyer and seller may relate to any or all of these price components.

According to one embodiment, the buyers is allowed to negotiate a tax adjusted product price. That is, the buyer bids a price which is indicated to be the amount the buyer wants to pay after any applicable taxes are added. Sellers for whom no taxes apply see a total bid price. Sellers for whom taxes apply see a tax adjusted bid, i.e., the buyer's bid price less the appropriate sales tax adjustment. Sellers can then look at this price, compare it against their product cost, and decide how much they want to counter-offer or whether they want to accept the bid price.

According to another embodiment, shipping prices are included in the equation. According to this approach, the buyer indicates the total price (product price+tax+shipping and handling) the buyer is willing to pay for a product for any shipping option. According to one embodiment, the transaction site provides a total price comparison to the buyer in addition to its list price comparison to aid in the buyer's determination of a total price bid. The total price for each products and seller is calculated from the product list price, shipping price data available from every seller which depends on the shipping option selected, and applicable taxes based on the geographical location of the seller (e.g., state) as determined from, for example, the zip code.

The buyer searches for a product, designates a shipping option, and is presented with the total price (and possibly the list price as well) for the product from each of a plurality of sellers. The total price for each merchant is derived in part from shipping price information for each seller for the selected product and shipping option. The buyer then makes a bid for the total price for a specific shipping option to one or more of the sellers. Automatic adjustments are made to the bid price before making seller-specific net bid prices available to the sellers. That is, the transaction site displays a tax and shipping price adjusted bid (i.e., a net bid price) to each of the sellers which takes into account the seller's unique circumstances. That is, for each seller, the transaction site takes the buyer's total bid price and subtracts any tax amount as well as the specific seller's shipping price for the designated shipping option. Each seller is then provided with a net bid price from the buyer for the product. Each seller can then compare the net bid price to their cost and decide whether to accept a bid or make a counteroffer. Any counter offer from a seller based on the net bid price is then adjusted upward for tax and shipping price before being made available to the buyer as the new ask price. The demand curve data for any seller are also calculated using the buyer's net bid price. This is because the net bid price reflects how much the buyer is willing to pay given the tax and the shipping price.

According to another embodiment, the net (or adjusted) bid price made available to each seller is based not on the seller's shipping prices, but on the actual cost to the seller of shipping the product to the buyer. This shipping cost information is provided by the seller to the transaction site. For sellers who have margins built into their shipping prices this approach allows them to make a meaningful comparison between the adjusted bid price, i.e., the net bid price, and their product cost. That is, if the buyer's total bid price is adjusted by the seller's shipping cost rather than its shipping price, the seller can assume a zero margin from shipping and thus look at the buyer's adjusted bid and directly compare it against the product cost. The demand curve data provided to the seller would also then be directly comparable to the product cost. This approach provides advantages for both the buyer and the seller. That is, the buyer is able to bid for the total deal price (i.e., product price+tax+shipping), while the seller gets to see an adjusted bid price which is a number that can be directly compared against the seller's cost.

Referring back to FIG. 2, if the buyer accepts the seller's ask price in interface 900 by activating the "Buy" button (212) or the seller accepts the buyer's bid price in interface 1200 of FIG. 17 (254), i.e., the buyer and seller agree on a price (216), all other negotiations relating to a mutually exclusive group associated with the product for which an agreement was reached are automatically terminated (218). That is, the availability to any sellers of the buyer's outstanding bids or quote solicitations (which are part of the mutually exclusive group defined by the buyer) is terminated. According to a specific embodiment, the buyer can enable this feature by specifying which of a plurality of currently ongoing negotiations should be part of a mutually exclusive group in which all negotiations are automatically terminated when an agreement in any one of the negotiations is reached. According to another embodiment, the system automatically creates mutually exclusive groups with reference to the buyer's bidding context.

Any number of mutually exclusive groups each relating to one or more products may be associated with a particular buyer in accordance with the goals of that buyer. According to a specific embodiment, the buyer may use the shopping list of the present invention to define the mutually exclusive groups. That is, as described above, the user may designate a shopping list as such a mutually exclusive group such that the bids submitted from that shopping list will be processed in accordance with the mutual exclusivity feature of the present invention. Alternatively, the products in a particular shopping list may be designated independent of each other in the case where, for example the buyer is interested in all of the products in the list. In addition, embodiments of the invention are contemplated in which the system automatically creates mutually exclusive groups for the buyer based on, for example, the fact that the buyer has submitted simultaneous bids to a number of different sellers for the same product, or to one or more sellers for two or more similar products.

The mutual exclusivity feature of the present invention has significant value for the buyer even where negotiations are non-binding because it will serve to protect the buyer's reputation. That is, as described herein, a buyer's reputation is tracked based on previous transaction behavior, especially with regard to the number of bids honored or reneged upon by the buyer. Mutual exclusivity provides a mechanism whereby the buyer may generate a number of non-binding bids without the risk that her failure to pursue some of those bids would sully her reputation.

After a deal has been made, the entry is highlighted in the buyer's relevant shopping list in interface 900 (FIG. 18), the date of the agreement is displayed in the "Purchase Date" column, and consummation of the transaction is facilitated (220). According to various embodiments, the buyer need only select HTML text in the "Merchant" column in interface 900 in the appropriate shopping list entry to go directly to the merchant's web site for consummation of the transaction.

According to other embodiments, the transaction may be consummated at the transaction site using private interfaces between the merchant and the buyer. According to still other embodiments, the buyer's payment and shipping information is provided to the seller by the transaction site upon authorization by the buyer. This information may be acquired by presenting an input interface to the buyer requesting the information, or, alternatively, from a database of previously collected information concerning the buyer.

In one embodiment of the invention, individual buyers are given incentives to influence prospective buyers to use the transaction web site on server 102. That is, the buyer submits a confidential list of e-mail addresses (or some other appropriate identifier) to the transaction web site. Transactions on the web site are monitored and some sort of economic benefit is automatically accrued to the buyer each time one of the prospective buyers on his list engages in a transaction. The economic benefit could be, for example, cash or transaction site "dollars", or discounts on future transactions. According to specific embodiments, both the number of people identified by the buyer in his list and the total amount of economic benefit accrued in a given period of time are limited. According to various embodiments, a buyer may only list individuals who are not currently users of the transaction site. That is the buyer may only benefit from the transactions of individuals who become users of the site after the buyer lists them.

According to various embodiments of the invention, incentives are provided not only to encourage buyers to influence others to use the transaction site, but also to make it attractive for current users to continue using the site. For example, accounts are created for each registered user in which virtual "dollars" are kept. These virtual dollars are a currency unique to the transaction site which may be used against purchases effected through the transaction site. As discussed above, one way of accruing virtual dollars is through transactions engaged in by a list of influences. Some percentage of a buyer's own transactions could also be credited to his account. In addition, a buyer could be offered virtual dollars for providing specific information in an online form for the administrator of the site or one of its marketing partners. For example, a buyer could be asked if he would mind filling out a credit card application form for a specific number of virtual dollars. These virtual dollar credits accrue to the buyer simply for filling out the form, regardless of whether or not an associated transaction is consummated. Moreover, the accrued credits may be used in any of a variety of ways at the transaction site at any time chosen by the holder of the credits. This is in contrast with features at various sites in which a credit is only applicable to a current transaction and only where the transaction goes through.

While the examples herein have been described with reference to a merchant entity having its own web site, it will be understood that a seller need not have a web site to effect transactions according to the present invention. In fact, according to various embodiments, it is possible for a merchant to be hosted by the transaction site described herein (e.g., server 102 of FIG. 1) and to conduct all of its business through the transaction site without having its own web site, wholesale, or retail facilities. Even individuals may act as sellers on specific embodiments of the transaction site of the present invention. Such individuals could list new or used items to the transaction site's database which, when satisfying a buyer's search criteria, would be listed alongside the similar products of merchants of all sizes. This allows sellers of all sizes to vie for customers on a relatively equal footing. It also allows buyers to see prices from a wide variety of sellers, even those without e-commerce enabled web sites.

Allowing individuals to act as sellers on the transaction site and post what are essentially classified ads makes other features of the present invention possible. For example, individual posting such classifieds to the transaction sites are given the option to automatically post the listing in an appropriate format to other free locations which are appropriate for the posting of such messages. For example, when specifying a listing on the transaction site of the present invention, an individual may select options which result in the automatic posting of the listing on Usenet or any of a wide variety of free classified sites. According to a specific embodiment, the postings are made in the name of the individual and contain hypertext links back to the transaction site. It is important to note that this type of posting would not qualify as SPAM in that they are posted by individuals and only on sites appropriate for such postings.

According to a specific embodiment of the invention, a buyer need not even submit a bid to begin negotiations with one or more sellers. Instead, the buyer may submit a request for quotes from sellers for a particular product or bundle of products. According to a specific embodiment, this may easily be accomplished by the buyer through the creation of a shopping list for the product or bundle of products, and designating the shopping list as one for which quotes are automatically solicited. According to specific embodiments, this could be the default for all new shopping lists. Alternatively, the buyer could be required to select this option when creating a new shopping list. This feature allows the buyer to make the sellers do the work. Once quotes are received by the buyer, negotiations can proceed in the manner described above. According to one embodiment, the request for quotes may be submitted via a shopping list created by the buyer as described above. That is, the buyer may create a specific shopping list for which he may select a "Request for Quotes" option in response to which a request for quotes is generated and posted for each of the items in the list. In a more specific embodiment, the buyer has the option of specifying particular sellers from which quotes are desired.

Other features of the present invention involve the concept of post-purchase tracking. According to one embodiment, data are compiled for the buyer across all products purchased through the transaction site. For example, data could be compiled for order numbers, product numbers, dollars expended on particular products or for all products. This feature is particularly valuable for a corporate buyer to keep track of inventory and spending.

According to other embodiments, individual products in a post-purchase list associated with a particular buyer are linked with lists of related products which would allow a buyer to subsequently upgrade the purchased product or to purchase add-on items. Once the linked list is presented to the buyer, negotiation for any of the products in the list may proceed in the manner described above.

According to still other embodiments, individual products in a post-purchase list associated with a particular buyer are linked with market data regarding the current value of those products. Associated hypertext links are also provided allowing the buyer to turn around and offer the product for sale. This subsequent resale may occur after the useful life of the product for that user, or immediately after the initial purchase. As will be understood, this feature enables speculation by the buyer in any of the products offered for sale through the transaction site.

In addition, the transaction site of the present invention can track all of the data necessary for the creation and trading of options at the transaction site. The fact that there may be many different list prices for a particular product is dealt with by using some sort of formula or default value which uniquely identifies a product price. For example, the median list price at the transaction site could be the value upon which the options are based. Alternatively, deal price data may be used. According to yet another alternative, some minimum price could be established by the transaction site.

Another embodiment of the present invention will now be described with reference to FIGS. 19-25. According to this embodiment of the present invention, when a buyer logs onto the site, a personal interface is provided as shown in FIG. 19 which has 4 tabbed areas with which the user can find products, place and track bids, and track purchases. The tabbed areas are entitled, respectively, "Getting Started," "Find Products" (shown in FIG. 19), "My Bids," and "Order History." "Getting Started" interface 2000 is shown in FIG. 20 and describes how to negotiate for and purchase items through the site.

"My Bids" interface 2100 allows the buyer to track any currently pending bids showing the product for which each bid was placed, the bid amount, and the current total price requested by the seller. In response to selection by the buyer of any of the products listed, detailed information about that product and bid are presented.

"Order History" interface 2200 presents a detailed history of the buyer's orders facilitated through the site including the product ordered, the date of the order, the seller, price per unit, any applicable taxes, shipping costs, total price, and the status of the order. As can be seen in the upper right hand corner of each of these interfaces, the buyer's reputation is shown. As discussed above and according to a specific embodiment, the reputation value shown represents the number of consummated transactions to the total number of bids placed by the buyer. Thus, this particular buyer with a reputation of "0" has followed through on as many bids as she has reneged.

Figure 23:

Referring back to FIG. 19, "Find Products" interface 1900 enables the buyer to search for products using keyword searching or by selecting one of the product categories and navigating through available products in the selected category. If, for example, the buyer selects "Notebooks & Laptops" under "Computer Systems," interface 2300 of FIG. 23 is presented in which all of the notebook and laptop computers available through the site are shown. In response to selection of one of these items, e.g., Celeron 433, interface 2400 of FIG. 24 is presented in which specific models are shown along with inventory status and the lowest available list price.

In response to selection of the third option in the list, i.e., the Travelpro model, interface 2500 of FIG. 25 is presented in which a list of sellers of the selected product is shown. The lists indicates for each seller whether the seller has the item in stock, the seller's list price, any applicable taxes and shipping costs, and a total price. From interface 2500, the buyer may submit simultaneous bids to any or all of the listed sellers by appropriately checking the boxes in the left hand column as shown. According to a specific embodiment, if bids to more than one seller are submitted, the system automatically creates a mutually exclusive group of the submitted bids. As discussed above, the mutually exclusive group operates to withdraw all remaining bids when any one is accepted. Also as discussed above, once a bid is accepted by one of the sellers, consummation of the transaction may be facilitated in a variety of ways.

Yet another embodiment of the present invention will now be described with reference to FIGS. 26-34. According to this embodiment of the present invention, interested third parties may view pending bids and facilitate acceptance of the bids as briefly described above. Such interested third parties may include, for example, the operator of the site which facilitates the transactions, e.g., the operator of the web site described herein. That is, the operator of such a site has an interest in maximizing the number of transactions successfully consummated on the site. Other interested third parties include, for example, the manufacturers and distributors of the products being offered by sellers on the transaction site. Obviously such entities have an interest in maximizing the market for their products. According to a specific embodiment, third party entities can enter into agreements with other third parties to act on their behalf in facilitating transactions. That is, some companies would like to take advantage of this feature without devoting resources to making it happen. Therefore, such a company may enter into an agreement with, for example, the operator of the web site of the present invention to perform this function according to parameters specified by the company.

In any case, when such a third party logs onto the site using the Spiffer Login interface 2600 of FIG. 26, a personal interface is provided as shown in FIG. 27 which has tabbed areas with which the third party can view currently pending bids, create and alter business rules, and view accepted bids and orders. The tabbed areas include "Dashboard," "Business Rules," "Accepted Bids," and "Orders."

An unpopulated "Dashboard" interface 2700 is shown in FIG. 27. By specifying certain parameters, the third party user can populate interface 2700 with information about currently pending bids as shown in interface 2800 of FIG. 28. For example, the third party user may specify that information relating only to bids for products currently in stock be displayed. The third party user may also filter the bid information to view only bids which have been pending less than a specific amount of time. The third party user may further limit the listed bid information by specifying the category of products and the maximum allowable spread between the bid price and the seller's asking price. The third party user may also sort the bid information according to multiple sort criteria using the "Primary" and "Secondary" sorts menus. According to a specific embodiment, these sort criteria may be any of the column headings for the bid information, e.g., product name, merchant, last response time, etc.

Referring again to FIG. 28, interface 2800 shows information relating to two currently pending bids. Each bid includes product information about the subject of the bid in the "Product Name" column as well as identifying the seller to which the particular bid was made in the "Merchant" column. The "Product Name" column also includes the number of items currently in the seller's stock, the part number, and the time of the most recent bid. The bid information also includes the number of units being bid upon (in the "Units" column), and the asking price being presented to the buyer which, according to a specific embodiment, is the seller's asking price less the amount being contributed by the third party (in the "Merchant Ask Price–My Promo=Ask to Buyer" column).

The buyer's current bid price as well as the difference between the bid price and the ask price presented to the buyer is displayed in the "Bid/Ask–Bid diff" column. Also included in this column is an "Accept" button with which the third party can effect acceptance of the buyer's bid on the seller's behalf. In response to selection of the "Accept" button, both the buyer and the seller are notified that the bid has been accepted and consummation of the transaction proceeds in the manner described above.

Alternatively, the third party may respond to the buyer's current bid price by selecting the "Counter" button in the "Respond" column. In response to selection of this button by the third party, a dialog box is presented to the third party in which the third party may increase the amount they are contributing to the transaction, i.e., their promotion. This amount is then reflected in the asking price being presented to the buyer.

The buyer is identified by an identification number which is unique to the buyer on the transaction site, and the buyer's current reputation rating. According to a specific embodiment, the buyer is also identified by an e-mail address. Finally, the "Dashboard" interface includes an entry for each bid in the "Last Response Time" column showing the time of the last response by anyone—e.g., buyer, seller, or third party—relating to the bid.

Business rules interfaces 2900 of FIG. 29 and 3000 of FIG. 30 allow a third party user to specify rules for automatically responding to bids in the system. Referring to FIG. 29, the third party user may view the details of any of his previously created business rules by selecting a particular rule in the "Current Business Rules" window. The currently viewed business rule may be deleted by selection of the "Delete Rule . . . " button. New rules may be created by selection of the "New Rule . . . " button.

According to the illustrated embodiment, the details of the currently selected business rule are shown in the lower part of the interface including the title of the rule in the "Title" window, a description of the rule in a comments window, and whether the rule is currently enabled in the system (i.e., via the "enabled" check box next to the title bar). The set of criteria corresponding to the rule are also presented. The example shown in interface 2900 illustrates a rule which applies to bids to the merchant CD World for videos of either of two recent films, "The Matrix" and "Austin Powers: The Spy Who Shagged Me." According to the rule, a buyer is given five chances to have the third party accept his bid on behalf of the merchant, i.e., for the transaction to be subsidized by the third party. The chances are measured by the buyer's current "Spiff Count" which, as specified in interface 2900, must be less than or equal to five.

The third party user may also specify other criteria of bids to which a response is desired. For example, the third party user may only want to extend a particular subsidy to a specific subset of buyers. By specifying, for example, in the "# of units" window that only bids for 1 unit are to be considered, the third party user can effectively eliminate buyers who want to deal in volume and focus on individual consumers. The third party user also may specify the type of buyer with which he wishes to deal by specifying an acceptable range of buyer reputation in the "Buyer Reputation" windows. As discussed above, the transaction site maintains a reputation indicator which is representative of the buyer's transaction history.

The third party user may specify the products to which the business rule applies by selecting one or more product identification numbers in the "NexTag Product Id" pull down menu which will then appear in the "Product Specific" window. Also, as discussed above, the third party user may specify the particular merchant and product line to which bids must be directed for the rule to apply (using the "Merchant Name" pull down menus). The third party may also specify that the identified merchant(s) must currently have an identified product in stock for the rule to apply. Additional business rule criteria may be added using the "add criteria" pull down menu.

Finally, the third party user specifies the desired response if all of the specified criteria are true. As shown, the response specified is to accept the bid if all of the other criteria are satisfied. It will be understood, however, that a variety of other responses may be specified such as, for example, a particular counter offer where the bid is outside of a certain spread range.

Interface 3000 of FIG. 30 illustrates a second business rule which applies to bids to the merchants Muzic Depot and CD Universe for videos of either of two recent films, "City of Angels" and "A Bug's Life." In this example, the spiff count is set to six, thus giving each buyer three chances to buy one of the specified video (because the third party's promotion applies to two merchants).

According to a specific embodiment, where a bid is part of a mutually exclusive bid group created by the buyer as described above, the dashboard interface identifies the bid as such to the third party. That is, the third party user can see that the buyer is simultaneously bidding for a similar product, thus providing additional incentive for the third party to promote the bid. According to one embodiment, the third party is only presented with information that the bid is part of a mutually exclusive group. According to another embodiment, detailed information regarding the other bids in the mutually exclusive group are presented. According to yet another embodiment, the third party can create business rules relating to whether or not the bid is part of a mutually exclusive group. That is, the third party could, for example, specify that where a bid is part of a mutually exclusive group he is willing to cover a higher bid/ask spread.

Given that the present invention also allow for specification of business rules by sellers (see discussion above with reference to FIGS. 13*a*-13*k*), specific embodiments of the invention provide for the interaction between seller and third party business rules. That is, the present invention provides methods for controlling implementation of third party business rules with reference to the business rules associated with sellers. Thus, for example, the system ensures that, where the seller to whom a bid is directed has rules which apply to the bid, the seller's rule(s) are implemented before the third party's. According to another embodiment, implementation of the third party's rules are simply delayed for a predetermined period of time from a specified event such as, for example, the submission of the bid.

The third party user may select the "Accepted Bids" tab to view Accepted Bids interface 3100 of FIG. 31. This interface provides the third party user with information for each of the bids he has accepted (either manually or automatically) in the system. Each entry identifies the date and time of acceptance, the buyer, the specific product, the number of units, the price per unit, a subtotal before tax and shipping costs are added, the third party user's promotional price, and the merchant upon whose behalf the bid was accepted.

Selection of the "Orders" tab results in presentation of either New Orders interface 3200 of FIG. 32, In Progress interface 3300 of FIG. 33, or Completed Orders interface 3400 of FIG. 34 depending upon the filter option selected by the third party user. These three interfaces represent three different stages in order fulfillment.

While the invention has been particularly shown and described with reference to specific embodiments thereof, it will be understood by those skilled in the art that changes in the form and details of the disclosed embodiments may be made without departing from the spirit or scope of the invention. For example, operation of a specific embodiment of the present invention has been illustrated herein with reference to a hypothetical transaction between a buyer and seller. It will be understood, however, that specific transactions will likely differ considerably from the example described without departing from the scope of the invention. Moreover, specific embodiment have been described herein with reference to a web site on the World Wide Web. It will be understood that the other embodiments of the invention may be implemented in any of a wide variety of network environments.

Additionally, the negotiations described above have been described largely as a non-binding process until after a mutually agreeable price has been found and the parties decide to consummate the deal. However, it will be understood that negotiations may be made partially or fully binding without departing from the scope of the invention. That is, a payment identifier such as, for example, a credit card or billing account may be requested before a party is allowed to negotiate. If the party attempts to terminate negotiations prematurely, some sort of penalty may be assessed to the identified account.

Many of the embodiments of the present invention have been described in a context in which a transaction site acts as an intermediary between buyers and sellers. However, it will be understood that the scope of the present invention also encompasses negotiations, transactions, and other various features described herein when occurring directly between a buyer and a seller on, for example, the web site of the seller. These features include (but are not limited to) shopping lists, mutual exclusivity, request for quotes, buyer reputation, demand curve creation and use, block responses, bundle bid creation, cross-selling, facilitation of transactions by interested third parties, and all other aspects of the invention described above.

Conceivably, any seller selling products at list prices on the Internet could get additional value by enabling negotiations and other related features as described herein. It is therefore important to note that the scope of this invention includes all of the features described herein, even where these features are enabled at the web sites of sellers who directly sell products to buyers. Therefore, the scope of the invention should be determined with reference to the appended claims.

What is claimed is:

1. A method of facilitating server-implemented transactions in a wide area network between a first party and one or more second parties, the method comprising:
    providing by a transaction server an ask price for a particular product to a first party, wherein the ask price is associated with a particular second party;
    submitting by the first party a bid price for the particular product of the particular second party in response to receiving the ask price, wherein the bid price is lower than the ask price;
    providing by the transaction server information relating to a transaction between the first party and the particular second party to a third party's computer via the wide area network, the information including the bid price associated with the first party and the ask price associated with the particular second party, wherein any interested entity facilitates consummation of the transaction as the third party via the wide area network; and
    transmitting a response from the third party's computer to the transaction server after receiving the bid price and the ask price, the response from the third party one of:
        a counteroffer wherein the counteroffer covers at least part of a first difference between the bid price and the ask price, wherein the transaction server transmits the counteroffer to the first party as an ask price; and
        an acceptance wherein the acceptance covers the difference between the bid price and the ask price, wherein the transaction server terminates negotiations with one or more second parties for the particular product and completes the transaction.

2. The method of claim 1 further comprising notifying the second party of the counteroffer transmitted to the first party via the wide area network.

3. The method of claim 1 further comprising notifying the second party of the acceptance transmitted to the first party via the wide area network.

4. The method of claim 1 wherein providing the information comprises transmitting a web page to the third party via the wide area network, an entry in the web page corresponding to the transaction between the first and second parties.

5. The method of claim 4 wherein transmitting a response from the third party's computer comprises providing at least one active object in the web page associated with the entry.

6. The method of claim 5 wherein the at least one active object comprises an acceptance button, activation of the acceptance button resulting in transmission of the acceptance to the first party via the wide area network.

7. The method of claim 5 wherein the at least one active object comprises a counteroffer button, activation of the counteroffer button resulting in transmission of the counteroffer to the first party via the wide area network.

8. The method of claim 5 wherein at least one active object comprises an acceptance button, activation of the acceptance button resulting in transmission of the acceptance to the second party via the wide area network.

9. The method of claim 5 wherein at least one active object comprises a counteroffer button, activation of the counteroffer button resulting in transmission of the counteroffer to the second party via the wide area network.

10. The method of claim 1 wherein providing the information comprises filtering current system bids according to at least one criterion specified by the third party.

11. The method of claim 10 wherein the current system bids each have a second bid price and a second ask price associated therewith, the at least one criterion including at least one of a product category, a product seller, and a spread which is compared with a second difference between the second bid price and the second ask price for each current system bid.

12. The method of claim 1 further comprising enabling the third party to facilitate consummation of the transaction by enabling the third party to specify at least one business rule for automatically responding to system bids via the wide area network.

13. The method of claim 12 wherein enabling the third party to specify the at least one business rule comprises providing a plurality of criteria to the third party via the wide area network, the at least one business rule corresponding to a subset of the criteria specified by the third party.

14. The method of claim 13 wherein the plurality of criteria includes at least one of a product identifier, a merchant identifier, a number of units being bid, a buyer reputation indicator, and whether an identified merchant has an identified product in stock.

15. The method of claim 12 wherein enabling the third party to specify the at least one business rule comprises providing a plurality of response options to the third party via the wide area network, the at least one business rule corresponding to a subset of the response options specified by the third party.

16. The method of claim 15 wherein the plurality of response options includes at least one of communicate the acceptance and communicate the counteroffer.

17. The method of claim 12 further comprising controlling implementation of the at least one business rule with reference to at least one other business rule associated with the second party.

18. The method of claim 17 wherein controlling implementation of the at least one business rule comprises implementing the at least one other business rule before implementing the at least one business rule.

19. The method of claim 17 wherein controlling implementation of the at least one business rule comprises waiting a predetermined time period before implementing at least one business rule.

20. The method of claim 1 further comprising enabling a fourth party to facilitate consummation of the transaction between the first and second parties in conjunction with the third party via the wide area network.

21. The method of claim 20 wherein enabling the fourth party to facilitate consummation of the transaction comprises enabling the fourth party to cover a remainder portion of the first difference.

22. The method of claim 1 wherein the information includes an identifier identifying the transaction as relating to a product which is part of a mutually exclusive bid group defined by one of the first and second parties.

23. The method of claim 22 wherein enabling the third party to facilitate consummation of the transaction comprises enabling the third party to specify at least one business rule for automatically responding to system bids via the wide area network, the at least one business rule relating to the identifier.

24. The method of claim 1 further comprising notifying the first party of the counteroffer transmitted to the second party via the wide area network.

25. The method of claim 1 further comprising notifying the first party of the acceptance transmitted to the second party via the wide area network.

26. A computer program product for facilitating transactions in a wide area network between a first party and one or more second parties, comprising:
   at least one computer readable medium; and
   computer program instructions stored in the at least one computer readable medium for causing at least a transaction server to:
      provide an ask price for a particular product to a first party, wherein the ask price is associated with a particular second party;
      submit by the first party a bid price for the particular product of the particular second party in response to receiving the ask price, wherein the bid price is lower than the ask price;
      provide information relating to a transaction between the first party and the particular second party to a third party's computer via the wide area network, the information including the bid price associated with the first party and the ask price associated with the particular second party, wherein any interested entity facilitates consummation of the transaction as the third party via the wide area network; and
      transmitting a response from the third party's computer to the transaction server after receiving the bid price and the ask price, the response from the third party one of:
         a counteroffer wherein the counteroffer covers at least part of a first difference between the bid price and the ask price, wherein the transaction server transmits the counteroffer to the first party as an ask price; and
         an acceptance wherein the acceptance covers the difference between the bid price and the ask price, wherein the transaction server terminates negotiations with one or more second parties for the particular product and completes the transaction.

27. A method of facilitating server-implemented transactions in a wide area network between a first party and one or more second parties, the method comprising:
   providing by a transaction server an ask price for a particular product to a first party, wherein the ask price is associated with a particular second party;
   submitting by the first party a bid price for the particular product of the particular second party in response to receiving the ask price, wherein the bid price is lower than the ask price;
   selectively providing by the transaction server information relating to a plurality of bids on a transaction site to a third party's computer via the wide area network, a first one of the bids involving the first party and the second party, the first bid including the bid price associated with the first party and the ask price associated with the particular second party, wherein any interested entity facilitates consummation of the transaction as the third party via the wide area network;
   transmitting a response from the third party's computer to the transaction server after receiving the bid price and the ask price, the response from the third party one of:
      a counteroffer wherein the counteroffer covers at least part of a first difference between the bid price and the ask price, wherein the transaction server transmits the counteroffer to the first party as an ask price; and
      an acceptance wherein the acceptance covers the difference between the bid price and the ask price, wherein the transaction server terminates negotiations with one or more second parties for the particular product and completes the transaction; and
   notifying the other of the first party or the second party of the response via the wide area network.

28. A method of facilitating server-implemented transactions in a wide area network between a first party and one or more second parties, the method comprising:
   providing by a transaction server an ask price for a particular product to a first party, wherein the first ask price is associated with a particular second party;
   submitting by the first party a bid price for the particular product of the particular second party in response to receiving the first ask price, wherein the bid price is lower than the ask price;
   providing by the transaction server information relating to a plurality of bids on a transaction site to a third party's computer via the wide area network, the information being of a real-time nature and including the bid price associated with the first party and the ask price associated with the particular second party, wherein the information further comprises one or more of real-time offers, ask prices, counteroffers, time in which offers and counteroffers are made, number and trend of completed transactions, number and trend of incomplete transactions, and transactional history, wherein any interested entity facilitates consummation of the transaction as the third party via the wide area network; and
   transmitting a response from the third party's computer to the transaction server after receiving the bid price and the ask price, the response from the third party one of:
      a counteroffer wherein the counteroffer covers at least part of a first difference between the bid price and the ask price, wherein the transaction server transmits the counteroffer to the first party as an ask price; and an acceptance wherein the acceptance covers the difference between the bid price and the ask price, wherein the transaction server terminates negotiations with one or more second parties for the particular product and completes the transaction.

29. The method of claim 28 further comprising presenting the information transmitted to a third party in a geographical format, allowing the third party to configure and adjust the presentation of the information.

30. The method of claim 28 further comprising notifying non-transactional parties via the wide area network, of buyer's completed and planned transactions at buyer's discretion.

31. The method of claim 28 further comprising automatic generating of a value indicative of a specific buyer's reputation, and providing the value via the wide area network to sellers and third parties involved in the transaction.

* * * * *